(12) United States Patent
Orita et al.

(10) Patent No.: US 12,282,603 B2
(45) Date of Patent: Apr. 22, 2025

(54) TACTILE PRESENTATION PANEL, TACTILE PRESENTATION TOUCH PANEL, TACTILE PRESENTATION TOUCH DISPLAY, AND TACTILE PRESENTATION KNOB

(71) Applicant: Mitsubishi Electric Corporation, Tokyo (JP)

(72) Inventors: Tae Orita, Tokyo (JP); Takeshi Ono, Tokyo (JP); Takayuki Morioka, Tokyo (JP); Yuichi Sasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/773,617

(22) PCT Filed: Dec. 5, 2019

(86) PCT No.: PCT/JP2019/047605
§ 371 (c)(1),
(2) Date: May 2, 2022

(87) PCT Pub. No.: WO2021/111577
PCT Pub. Date: Jun. 10, 2021

(65) Prior Publication Data
US 2022/0374084 A1    Nov. 24, 2022

(51) Int. Cl.
*G06F 3/01*       (2006.01)
*G06F 3/0362*   (2013.01)
(Continued)

(52) U.S. Cl.
CPC ............ *G06F 3/016* (2013.01); *G06F 3/0362* (2013.01); *G06F 3/0393* (2019.05); *G06F 3/0446* (2019.05)

(58) Field of Classification Search
None
See application file for complete search history.

(56) References Cited

U.S. PATENT DOCUMENTS

2008/0158149 A1* 7/2008 Levin ...................... G06F 3/016
                                                                    345/156
2010/0079403 A1* 4/2010 Lynch ................. G06F 3/04886
                                                                    345/173
(Continued)

FOREIGN PATENT DOCUMENTS

JP       2013178678 A   *  9/2013
JP       2014-59833 A       4/2014
(Continued)

OTHER PUBLICATIONS

International Search Report issued Feb. 25, 2020, in International Application No. PCT/JP2019/047605.
(Continued)

*Primary Examiner* — Kirk W Hermann
(74) *Attorney, Agent, or Firm* — XSENSUS LLP

(57) ABSTRACT

A tactile presentation panel includes a tactile presentation voltage generation circuit that generates a voltage signal having a first frequency to be applied to at least one first electrode located in at least a partial region on an operation surface of the tactile presentation panel, and generates a voltage signal having a second frequency different from the first frequency to be applied to at least one second electrode located in at least a partial region on the operation surface of the tactile presentation panel, a charge discharge portion that is connected to the tactile electrode and discharges charges accumulated in a conductive elastic portion, and a touch detection circuit that detects contact of the user with a tactile presentation knob.

18 Claims, 32 Drawing Sheets

(51) Int. Cl.
*G06F 3/039* (2013.01)
*G06F 3/044* (2006.01)

(56) References Cited

U.S. PATENT DOCUMENTS

| | | | | |
|---|---|---|---|---|
| 2011/0175835 | A1* | 7/2011 | Wang | G06F 3/0446 |
| | | | | 345/173 |
| 2013/0307789 | A1* | 11/2013 | Karamath | G06F 3/016 |
| | | | | 345/173 |
| 2014/0152621 | A1* | 6/2014 | Okayama | G06F 3/04182 |
| | | | | 345/174 |
| 2014/0267039 | A1* | 9/2014 | Curtis | G06F 3/0338 |
| | | | | 345/161 |
| 2015/0103024 | A1 | 4/2015 | Haga et al. | |
| 2015/0169080 | A1* | 6/2015 | Choi | G06F 3/0488 |
| | | | | 345/184 |
| 2015/0185848 | A1 | 7/2015 | Levesque et al. | |
| 2015/0185928 | A1* | 7/2015 | Son | G06F 3/0445 |
| | | | | 345/174 |
| 2016/0179260 | A1* | 6/2016 | Ham | G06F 3/0412 |
| | | | | 345/173 |
| 2016/0282944 | A1* | 9/2016 | Haga | G06F 3/04886 |
| 2017/0168572 | A1* | 6/2017 | Peshkin | G06F 3/016 |
| 2017/0269686 | A1 | 9/2017 | Khoshkava et al. | |
| 2018/0011572 | A1* | 1/2018 | Wang | G06F 3/0412 |
| 2018/0024649 | A1* | 1/2018 | Uno | G06F 3/0338 |
| | | | | 345/174 |
| 2018/0348874 | A1* | 12/2018 | Khoshkava | G06F 3/016 |
| 2018/0373351 | A1* | 12/2018 | Sawada | H01H 19/005 |
| 2019/0220132 | A1* | 7/2019 | Sugimoto | G06F 3/044 |
| 2020/0142529 | A1* | 5/2020 | Nugraha | G06F 3/0416 |
| 2020/0218351 | A1 | 7/2020 | Orita et al. | |
| 2022/0004303 | A1* | 1/2022 | Kakinoki | G06F 3/02 |

FOREIGN PATENT DOCUMENTS

| | | |
|---|---|---|
| JP | 2015-97076 A | 5/2015 |
| JP | 2015-130168 A | 7/2015 |
| JP | 2016-206860 A | 12/2016 |
| JP | 2017-168104 A | 9/2017 |
| WO | 2013/069289 A1 | 5/2013 |
| WO | WO-2018223334 A1 * 12/2018 ............ G06F 3/044 |
| WO | 2019/030987 A1 | 2/2019 |

OTHER PUBLICATIONS

U.S. Appl. No. 17/779,142, filed May 24, 2022, Masami, Hayashi.
U.S. Appl. No. 17/781,408, filed Jun. 1, 2022, Tae Orita.
U.S. Appl. No. 17/777,055, filed May 16, 2022, Tae Orita.
U.S. Appl. No. 17/781,722, filed Jun. 2, 2022, Tae Orita.

* cited by examiner

F I G. 4
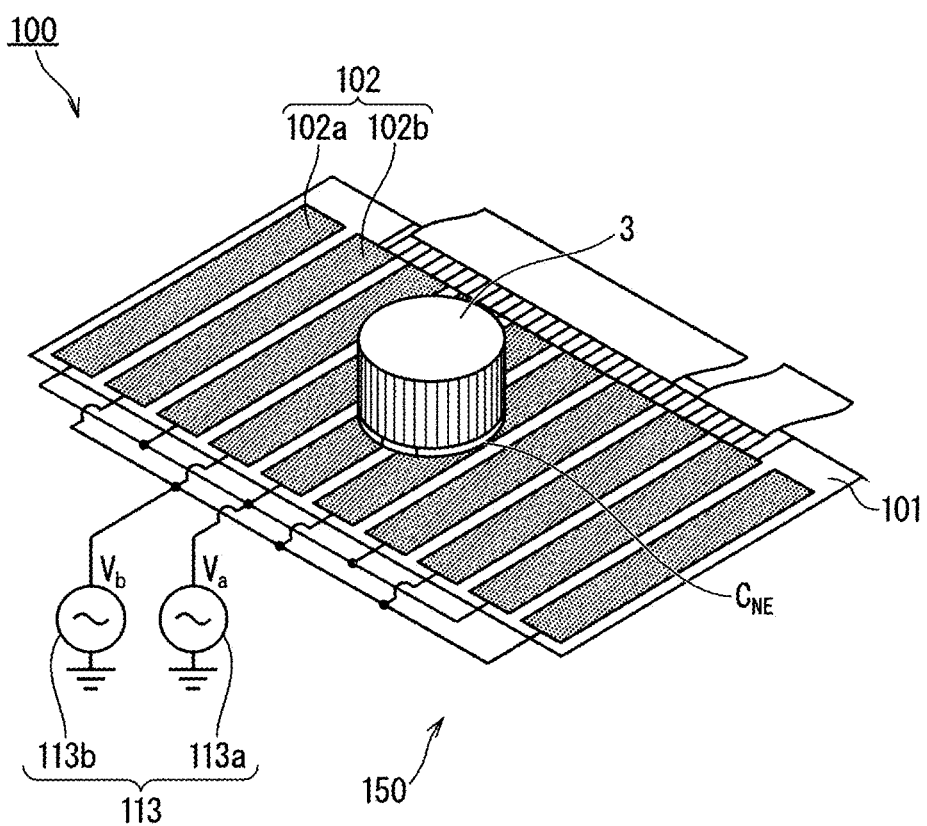

F I G. 1 1
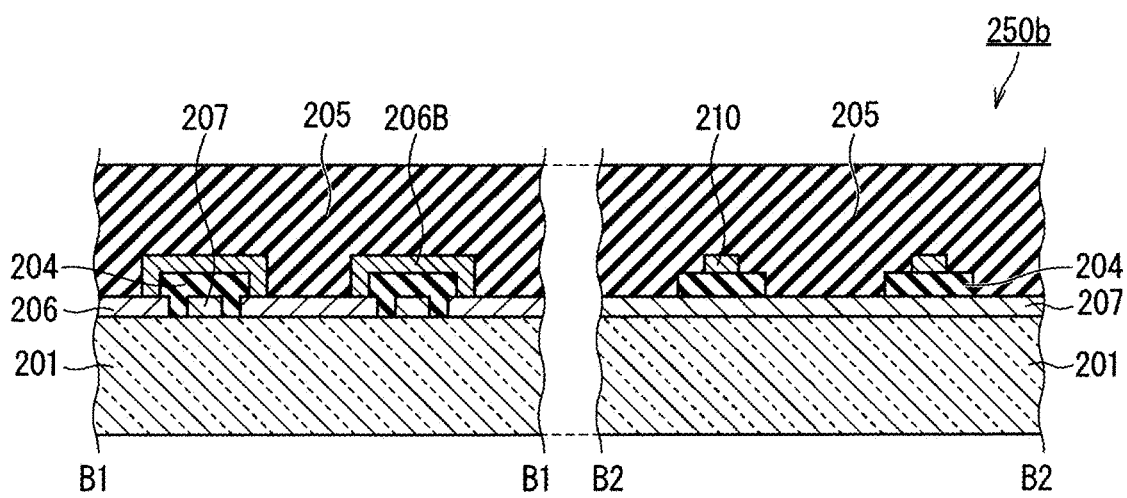

F I G. 1 3
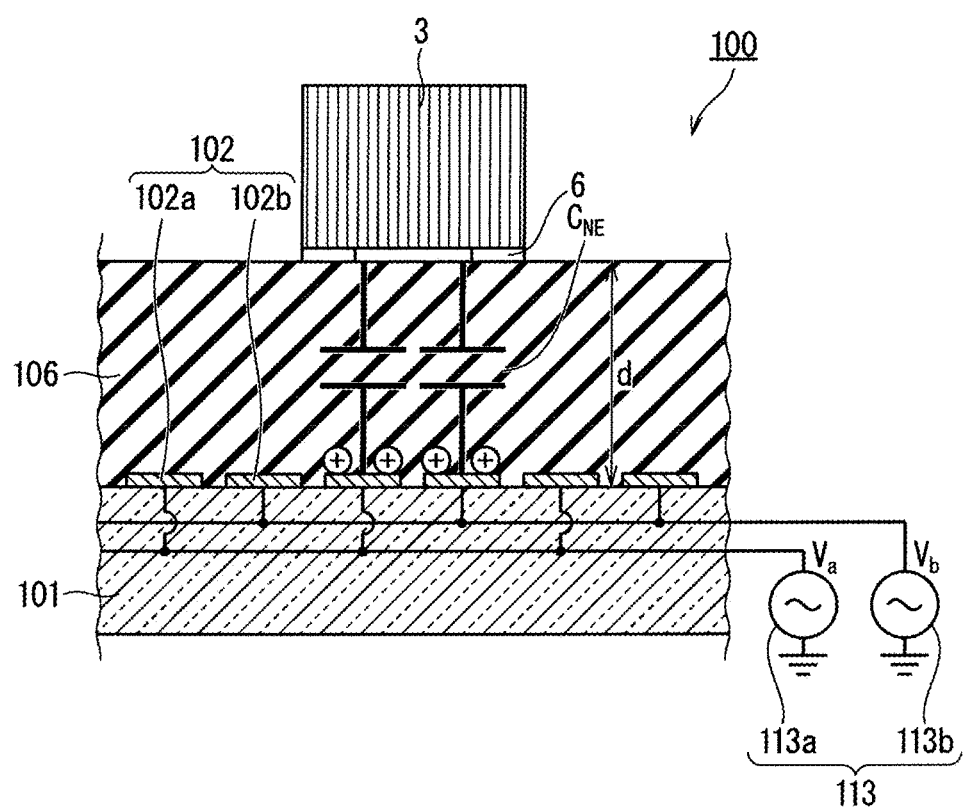

F I G. 1 4
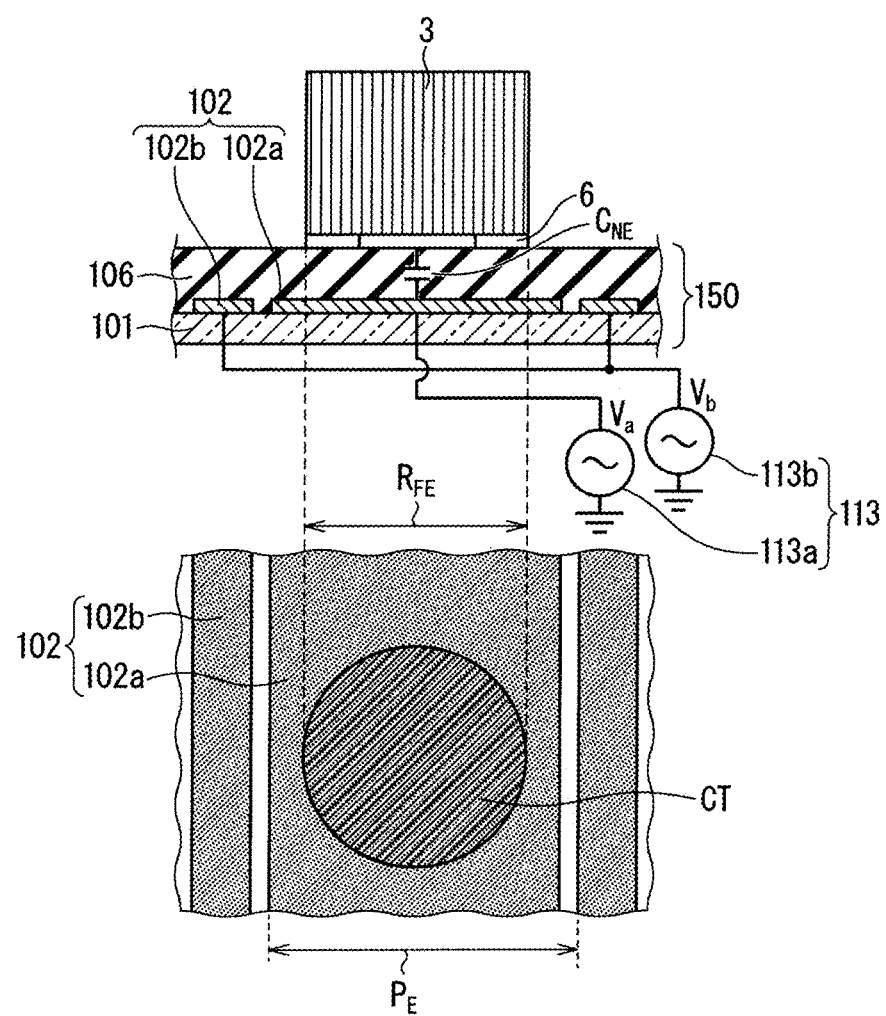

F I G. 1 5
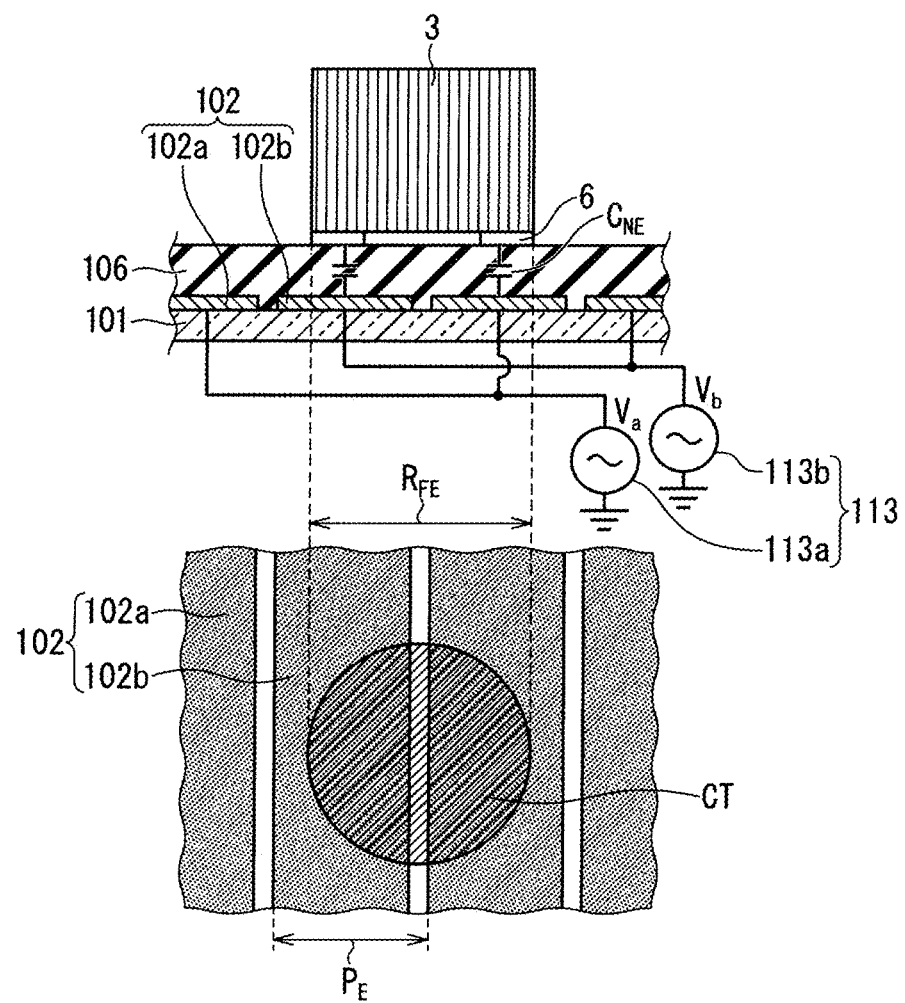

F I G. 2 1
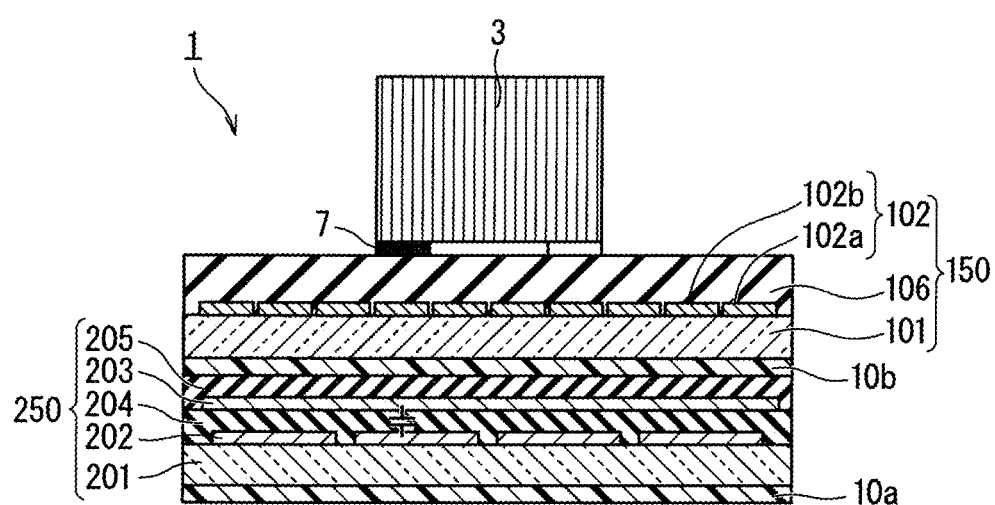

F I G. 2 3
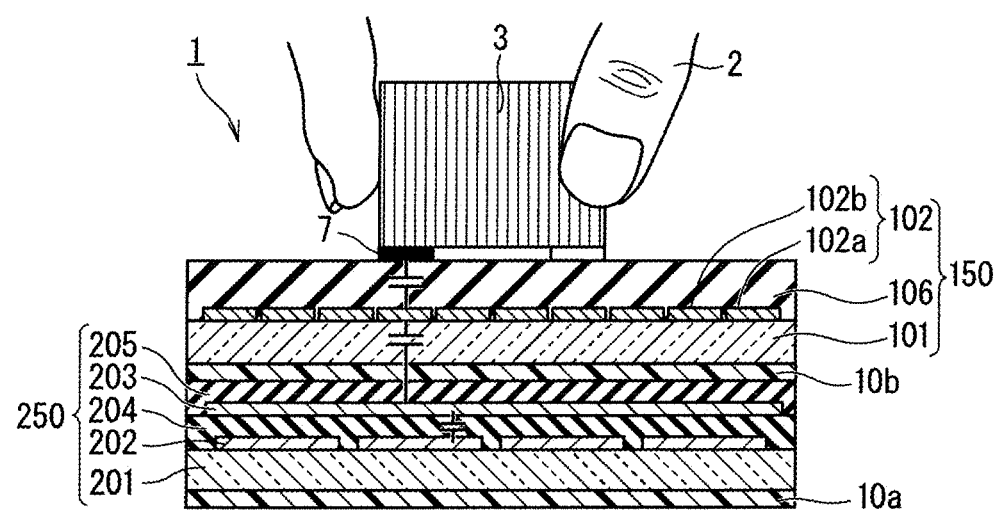

TACTILE PRESENTATION PANEL, TACTILE PRESENTATION TOUCH PANEL, TACTILE PRESENTATION TOUCH DISPLAY, AND TACTILE PRESENTATION KNOB

CROSS-REFERENCE TO RELATED APPLICATION

The present application is based on PCT filing PCT/JP2019/047605, filed Dec. 5, 2019, the entire contents of which is incorporated herein by reference.

TECHNICAL FIELD

The present invention relates to a tactile presentation panel that presents a tactile sense to the user via a tactile presentation knob, a tactile presentation touch panel including the tactile presentation panel and a touch panel, a tactile presentation touch display including the tactile presentation touch panel and a display panel, and the tactile presentation knob.

BACKGROUND ART

A touch panel is widely known as an apparatus that detects and outputs a position (hereinafter, sometimes referred to as a "touch position") instructed by an indicator such as a finger of the user or a pen on a touch screen, and there is a projected capacitive touch panel (PCAP) as a touch panel using a capacitive sensing system. The PCAP can detect a touch position even in a case where a surface on the user side (hereinafter, sometimes referred to as a "front surface") of a touch screen is covered with a protective plate such as a glass plate having a thickness of about several mm. Further, the PCAP has advantages such as excellent robustness because a protective plate can be arranged on the front surface, and long life because no movable portion is included.

A touch screen of the PCAP includes a detection row direction wiring layer that detects coordinates of a touch position in a row direction and a detection column direction wiring layer that detects coordinates of a touch position in a column direction. In description below, the detection row direction wiring layer and the detection column direction wiring layer may be collectively referred to as a "detection wiring layer".

Further, a member on which the detection wiring layer is arranged is referred to as a "touch screen", and an apparatus in which a detection circuit is connected to the touch screen is referred to as a "touch panel". Furthermore, an area where a touch position can be detected on the touch screen is referred to as a "detectable area".

As the detection wiring layer for detecting electrostatic capacitance (hereinafter, may be simply referred to as "capacitance"), a first series conductor element formed on a thin dielectric film and a second series conductor element formed on the first series conductor element with an insulating film interposed between them are included. There is no electrical contact between the conductor elements, and one of the first series conductor element and the second series conductor element overlaps the other in plan view when viewed from the normal direction of the front surface. However, there is no electrical contact between the conductor elements, and the conductor elements intersect three-dimensionally.

Coordinates of a touch position of an indicator are identified as capacitance (hereinafter, sometimes referred to as "touch capacitance") formed between the indicator and a conductor element which is a detection wiring by a detection circuit. Further, the touch position between conductor elements can be interpolated by a relative value of detected capacitance of one or more conductor elements.

In recent years, a touch panel as an operation panel including a switch or the like has become used for many personal devices instead of a mechanical switch. However, since the touch panel has no unevenness like a mechanical switch and has a uniform touch, a surface shape is not changed by operation. For this reason, it is necessary to perform all the operation processes from position check of a switch to operation execution and operation completion by relying on vision, and there is a problem in reliability of blind operation and operability by a visually handicapped person at the time of operation performed in parallel with other work such as operation of a sound or the like during driving of an automobile.

For example, since a touch panel has become widely used in an in-vehicle device from the viewpoint of designability, it is difficult to operate the in-vehicle device by blind touch during driving, and from the viewpoint of ensuring safety, attention to a touch panel with a function that enables operation by blind touch is increasing. Further, in consumer devices, a touch panel as an operation panel has become used in many home appliances and electronic devices. Furthermore, from the viewpoint of designability, devices equipped with the PCAP whose surface is protected with cover glass are also increasing. However, since the touch panel has a smooth surface, it is difficult to check the position of a switch by touch, and it is difficult to support universal design. In the case of the PCAP, a smooth glass surface is required as design property, and it is difficult to support universal design such as processing unevenness on a glass surface corresponding to a switch position.

As a countermeasure against the above, there is a method of notifying that operation has been accepted and that operation has been completed by voice. However, a function and versatility equivalent to those of a mechanical switch are yet to be achieved, since, for example, an environment in which a voice function can be used is limited due to privacy and noise problems. If there are a function of presenting the position of a switch on the touch panel, a function of receiving operation, and a function of feeding back the completion of operation to the user by tactile sense, it is possible to realize operation by blind touch and support for universal design.

A mobile phone and a smartphone may have a tactile feedback feature using vibration to compensate for operational reliability and non-visual operability. It is expected that a feedback function by vibration in conjunction with operation by the user will rapidly become familiar, and demand for more advanced tactile feedback will increase.

Systems for generating a tactile sense are roughly divided into three types: a vibration system, an ultrasonic system, and an electric system. A feature of the vibration system is that it is possible to coexist with the PCAP and the cost is low. However, the vibration system is unsuitable for incorporation of a vibrator into a housing in a manner that the entire device vibrates sufficiently, and the area cannot be increased due to the limit of output of a vibrator. The ultrasonic system is capable of generating a tactile sense that cannot be generated by other systems, such as a smooth feeling. However, for the same reason as the vibration system, the ultrasonic method is unsuitable for incorporation into a housing, and is disadvantageous in that a large area cannot be obtained. The electric system includes an electrostatic friction system that generates a tactile sense by an electrostatic frictional force and an electric stimulation system that directly applies an electric stimulus to a finger. These systems can generate a tactile sense at an optional position, and a large area can be obtained and multi-touch can be supported.

Hereinafter, this system will be described. Note that, hereinafter, a member in which a tactile electrode is arranged on a transparent insulating substrate is referred to as a "tactile presentation screen", and an apparatus in which a detection circuit is connected to the tactile presentation screen is referred to as a "tactile presentation panel". Further, an area where a tactile sense can be presented on the tactile presentation screen is referred to as a "tactile presentable area".

Regarding a tactile output device for a rotary knob, for example, in Patent Document 1, a tactile output device includes an electrode, a dielectric material arranged on the electrode, and a controller that inputs a signal to the electrode. The dielectric material has micropatterned unevenness on a surface with which the user is in contact. When the controller inputs a signal to the electrode, a projecting portion of the micropatterned dielectric material is charged, and an electrostatic force is generated between the projecting portion and the rotary knob, so that the user can feel a tactile sense.

PRIOR ART DOCUMENT

Patent Document

Patent Document 1: Japanese Patent Application Laid-Open No. 2017-168104

SUMMARY

Problem to be Solved by the Invention

In Patent Document 1, in a case where a rotary knob is placed on a tactile output device that applies voltage to skin in contact with space between electrodes via the electrodes and presents tactile stimulation in a pseudo manner, and friction and adhesion between the tactile output device and the rotary knob are controlled to give the rotary knob a tactile sense indicating an operation feeling and an operation amount, electric charges generated in the rotary knob due to an electrostatic force generated between an electrode of the tactile output device to which voltage is applied and the rotary knob are accumulated in the rotary knob, the friction and adhesion between the tactile output device and the rotary knob no longer change, and tactile strength decreases. Further, when electric charges are further accumulated in the rotary knob, a discharge phenomenon may occur between the electrode and the rotary knob, and an insulating layer arranged on the electrode and in contact with the rotary knob may be destroyed.

As described above, in a case where a tactile sense is presented on the rotary knob on a tactile presentation panel of an electrostatic friction system, electric charges are likely to be accumulated in a conductive elastic portion of the rotary knob that is arranged on a surface in contact with an insulating layer (dielectric layer) arranged on a tactile electrode arranged on a surface of the tactile presentation panel and forms capacitance with the tactile electrode. When electric charges accumulate in the conductive elastic portion of the rotary knob, the tactile strength to be imparted to the user becomes weak, which leads to a problem that an appropriate tactile sense cannot be imparted to the user.

The present invention has been made to solve such a problem, and an object of the present invention is to provide a tactile presentation panel, a tactile presentation touch panel, a tactile presentation touch display, and a tactile presentation knob capable of imparting an appropriate tactile sense to the user.

Means to Solve the Problem

In order to solve the above problem, a tactile presentation panel according to the present invention is a tactile presentation panel in which a tactile presentation knob having a plurality of conductive elastic portions is placed on an operation surface, the tactile presentation panel presenting a tactile sense to the user via the tactile presentation knob. The tactile presentation panel includes a tactile electrode including a plurality of first electrodes and a plurality of second electrodes provided on the operation surface side of the tactile presentation panel, a dielectric layer covering the tactile electrode and having one surface as the operation surface, a voltage generation circuit that generates a voltage signal having a first frequency to be applied to at least one of the first electrodes located in at least a partial region on the operation surface of the tactile presentation panel, and generates a voltage signal having a second frequency different from the first frequency to be applied to at least one of the second electrodes located in at least a partial region on the operation surface of the tactile presentation panel, a charge discharge portion that is connected to the tactile electrode and discharges electric charges accumulated in the conductive elastic portion, and a contact detection unit that detects contact of the user with the tactile presentation knob.

Effects of the Invention

According to the present invention, the tactile presentation panel according to the present invention includes a voltage generation circuit that generates a voltage signal having a first frequency to be applied to at least one first electrode located in at least a partial region on an operation surface of the tactile presentation panel, and generates a voltage signal having a second frequency different from the first frequency to be applied to at least one second electrode located in at least a partial region on the operation surface of the tactile presentation panel, a charge discharge portion that is connected to the tactile electrode and discharges electric charges accumulated in a conductive elastic portion, and a contact detection unit that detects contact of the user with a tactile presentation knob. Accordingly, an appropriate tactile sense can be imparted to the user.

An object, a feature, an aspect, and an advantage of the present invention will become more clear from detailed description below and the accompanying drawings.

BRIEF DESCRIPTION OF DRAWINGS

FIG. 4 is a perspective view for explaining electrostatic capacitance formed between the tactile electrode and the tactile presentation knob included in the tactile presentation panel in FIG. 2.

FIG. 11 is a partial cross-sectional view taken along line B1-B1 and line B2-B2 in FIG. 10.

FIG. 13 is a schematic diagram for explaining electrostatic capacitance formed between the tactile electrode and an indicator included in the tactile presentation panel in FIG. 2.

FIG. 14 is a schematic diagram for explaining electrostatic capacitance formed between the tactile electrode and the tactile presentation knob in a case where a pitch of the tactile electrode included in the tactile presentation panel in FIG. 2 is larger than a diameter of the tactile presentation knob.

FIG. 15 is a schematic diagram for explaining electrostatic capacitance formed between the tactile electrode and the tactile presentation knob in a case where a pitch of the tactile electrode included in the tactile presentation panel in FIG. 2 is smaller than a diameter of the tactile presentation knob.

FIG. 21 is a schematic diagram for explaining electrostatic capacitance formed in the tactile presentation touch panel in FIG. 1 when the indicator is not in contact with the tactile presentation knob.

FIG. 23 is a schematic diagram for explaining electrostatic capacitance formed in the tactile presentation touch panel in FIG. 1 when the indicator is in contact with the tactile presentation knob.

DESCRIPTION OF EMBODIMENTS

Embodiments of the present invention will be described below with reference to the drawings.

First Embodiment

<Tactile Presentation Touch Display>

Figure 1:
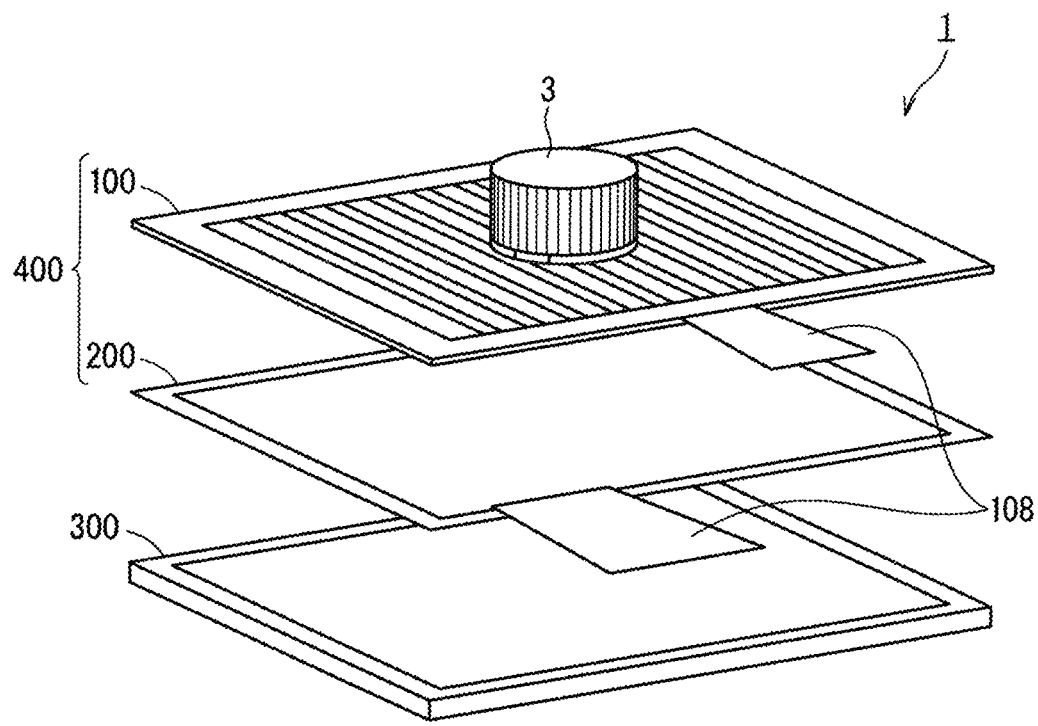
FIG. 1 is an exploded perspective view schematically illustrating a configuration of a tactile presentation touch display according to a first embodiment of the present invention.
Figure 2:
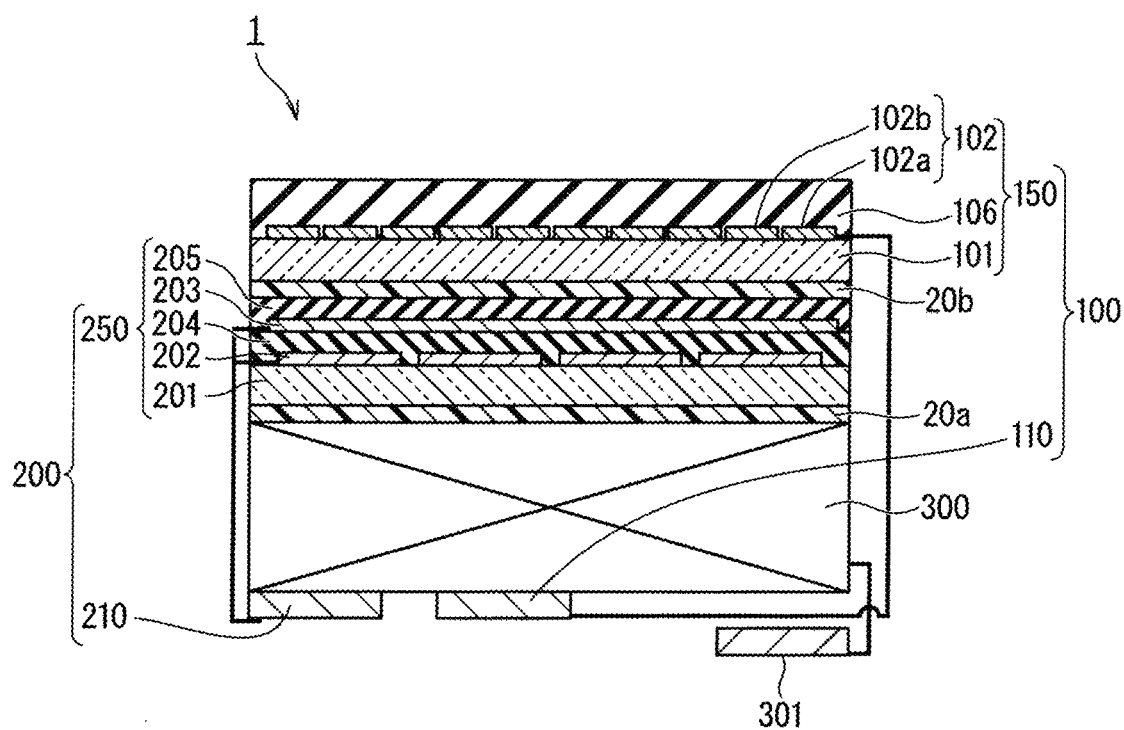
FIG. 2 is a cross-sectional view schematically illustrating a configuration of a tactile presentation touch display of FIG. 1.

FIG. 1 is an exploded perspective view schematically illustrating a configuration of a tactile presentation device in which a tactile presentation knob 3 is placed on a tactile presentation touch display 1 according to a first embodiment to present an operational feeling and a tactile sense of an operation amount. FIG. 2 is a cross-sectional view schematically illustrating a configuration of the tactile presentation touch display 1.

The tactile presentation touch display 1 includes a tactile presentation touch panel 400 and a display panel 300 to which the tactile presentation touch panel 400 is attached. The tactile presentation touch panel 400 includes a tactile presentation panel 100 and a touch panel 200. The tactile presentation panel 100 includes a tactile presentation screen 150 and a voltage supply circuit 110. The touch panel 200 includes a touch screen 250 and a touch detection circuit 210.

In the first embodiment, the tactile presentation screen 150 is arranged on the side (front side) facing the user of the tactile presentation touch display 1, and is fixed to a surface (front surface) facing the user of the touch screen 250 by an adhesive material 10b. The touch screen 250 is fixed to a surface (front surface) facing the user of the display panel 300 facing the user by an adhesive material 20a.

The tactile presentation screen 150 includes a transparent insulating substrate 101, a tactile electrode 102, and a dielectric layer 106. The tactile electrode 102 includes a plurality of first electrodes 102a and a plurality of second electrodes 102b alternately arranged at intervals on the transparent insulating substrate 101. The dielectric layer 106 covers a plurality of the first electrodes 102a and a plurality of the second electrodes 102b. The tactile presentation screen 150 is electrically connected to the voltage supply circuit 110 by a flexible print circuit (FPC) 108.

The touch screen 250 includes a substrate 201 that is transparent and has insulating property, an excitation electrode 202, a detection electrode 203, an interlayer insulating layer 204, and an insulating layer 205. The touch screen 250 is electrically connected to the touch detection circuit 210 by the FPC 108. The touch detection circuit 210 detects a touched position on the transparent insulating substrate 101 of tactile presentation screen 150. This enables not only tactile presentation but also touch position detection on the transparent insulating substrate 101. The touch detection circuit 210 includes, for example, a detection integrated circuit (IC) for detecting a change in electrostatic capacitance due to touching and a microcomputer. Details of the configuration of the touch screen 250 will be described later with reference to a specific example.

The display panel 300 includes two transparent insulating substrates facing each other, and a display function layer sandwiched between them and having a display function. The display panel 300 is typically a liquid crystal panel. The display panel 300 may be an organic electro-luminescence (EL) panel or an electronic paper panel. The touch panel 200 is typically a PCAP.

<Outline of Tactile Presentation Panel>

Figure 3:
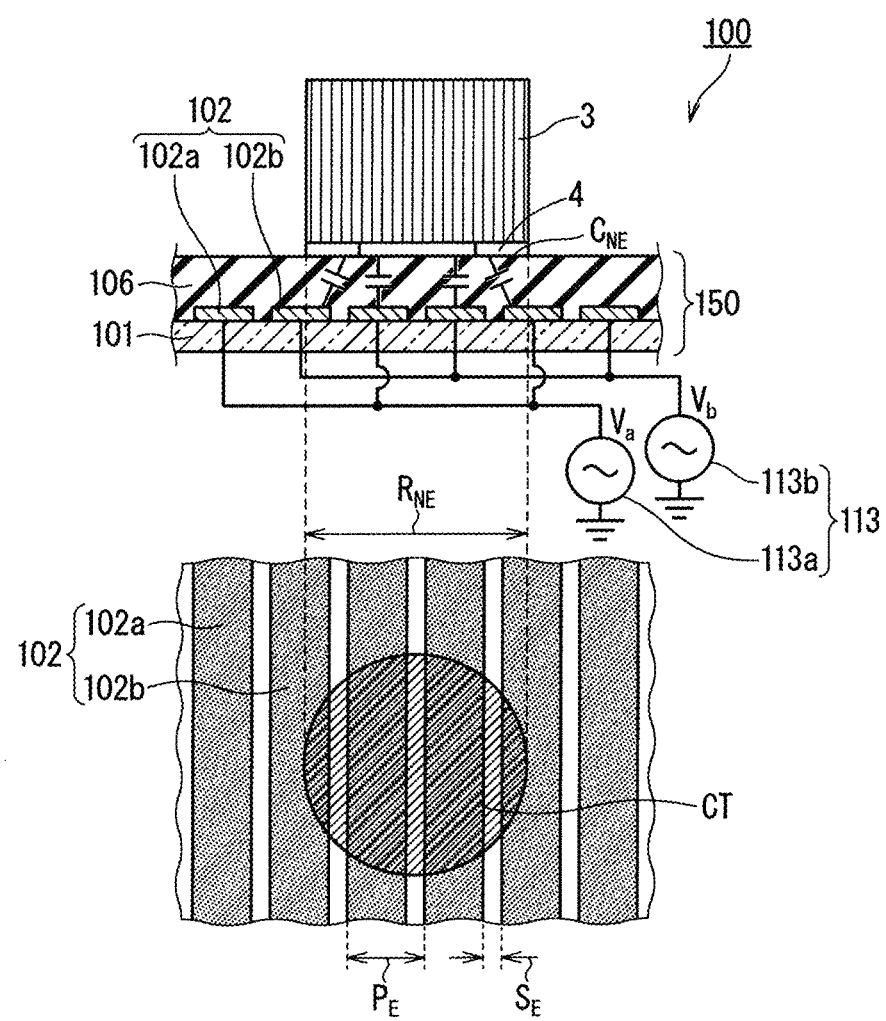
FIG. 3 is a schematic diagram for explaining electrostatic capacitance formed between a tactile electrode and a tactile presentation knob included in a tactile presentation panel in FIG. 2.

FIG. 3 is a diagram for schematically explaining electrostatic capacitance $C_{NE}$ formed between the tactile electrode 102 and the tactile presentation knob 3 included in the tactile presentation panel 100. FIG. 4 is a perspective view of FIG. 3. When the tactile presentation knob 3 touches a contact surface CT which is a part of the front surface of the tactile presentation screen 150, electrostatic capacitance $C_{NE}$ is formed between the tactile presentation knob 3 and the tactile electrode 102 on the contact surface CT via the dielectric layer 106. Note that, in these diagrams, only a tactile presentation voltage generation circuit 113 included in the voltage supply circuit 110 (see FIG. 2) is illustrated for easy understanding of the diagrams, and other configurations included in the voltage supply circuit 110 are not illustrated. A more specific configuration of the voltage supply circuit 110 will be described later.

The tactile presentation voltage generation circuit 113 included in the voltage supply circuit 110 includes a first voltage generation circuit 113a and a second voltage generation circuit 113b. The first voltage generation circuit 113a applies a voltage signal $V_a$ to the first electrode 102a located on at least a partial region of the transparent insulating substrate 101 among a plurality of the first electrodes 102a, and applies the voltage signal $V_a$ to all the first electrodes 102a located on at least a partial region of the transparent insulating substrate 101 in the first embodiment. The second voltage generation circuit 113b applies a voltage signal $V_b$ to the second electrode 102b located on at least a partial region of the transparent insulating substrate 101 among a plurality of the second electrodes 102b, and applies the voltage signal $V_b$ to all the second electrodes 102b located on at least a partial region of the transparent insulating substrate 101 in the first embodiment.

Figure 5:
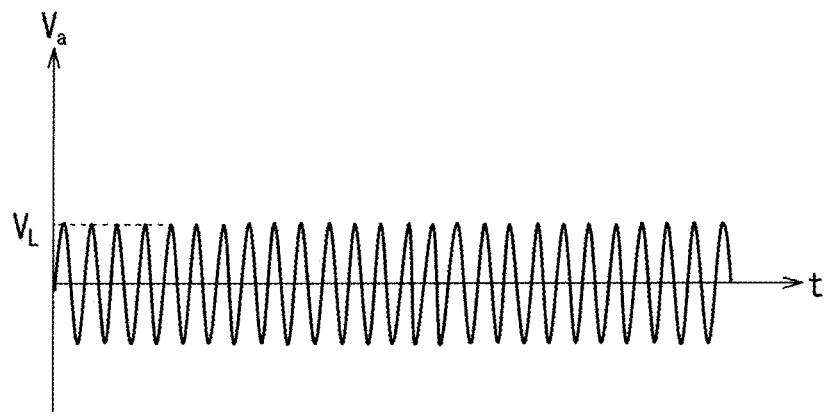
FIG. 5 is a graph illustrating an example of a voltage signal of a first frequency applied to a first electrode of FIG. 2.
Figure 6:
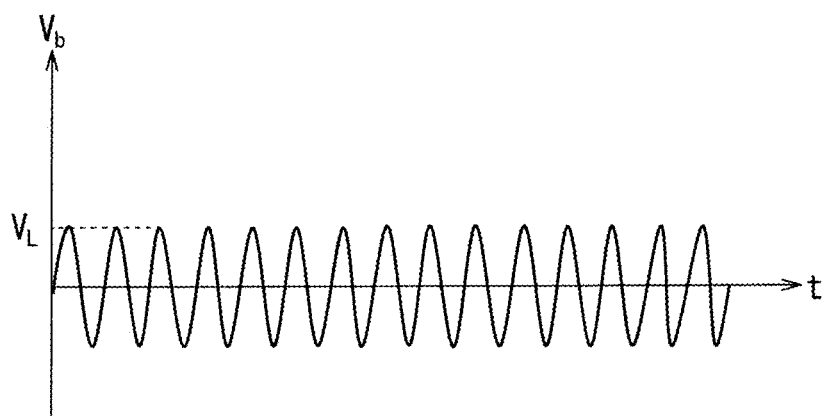
FIG. 6 is a graph illustrating an example of a voltage signal of a second frequency applied to a second electrode of FIG. 2.

Each of FIGS. 5 and 6 is a graph illustrating an example of the voltage signal $V_a$ and the voltage signal $V_b$. The voltage signal $V_a$ of the first voltage generation circuit 113a has a first frequency. The voltage signal $V_b$ of the second voltage generation circuit 113b has a second frequency different from the first frequency. An amplitude of the voltage signal $V_a$ and an amplitude of the voltage signal $V_b$ may be the same amplitude $V_L$. In the examples of FIGS. 5 and 6, sine waves having different frequencies are used as the voltage signal $V_a$ and the voltage signal $V_b$. Instead of the sine wave, a pulse wave or one having another shape may be used. In order to generate a sufficiently large tactile sense, the amplitude $V_L$ is preferably about several tens of volts.

Figure 7:
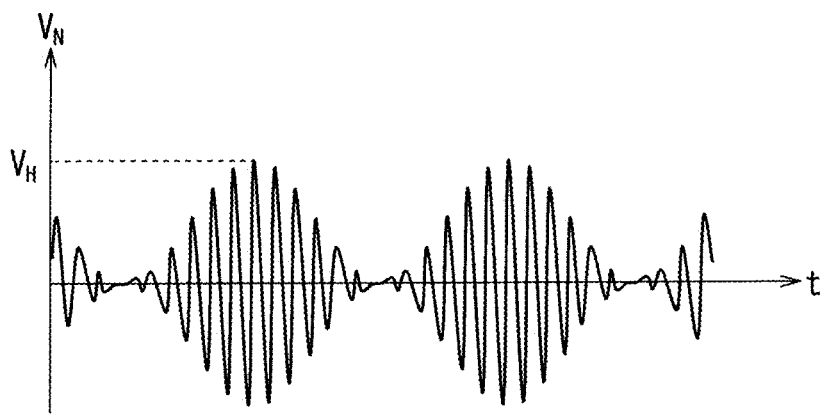
FIG. 7 is a graph illustrating an amplitude modulation signal generated by combining voltage signals of FIGS. 5 and 6.

FIG. 7 is a graph illustrating an amplitude modulation signal $V_N$ generated by combining the voltage signal $V_a$ (see FIG. 5) and the voltage signal $V_b$ (see FIG. 6). The voltage signal $V_a$ is applied to the first electrode 102a, and the voltage signal $V_b$ is applied to the second electrode 102b. As a result, in a region where the electrostatic capacitance $C_{NE}$ (see FIG. 4) is formed between each of the first electrode 102a and the second electrode 102b and the tactile presentation knob 3, charging and discharging are repeated according to the amplitude modulation signal $V_N$ having a maximum amplitude $V_H$ that is approximately twice the amplitude $V_L$. As a result, an electrostatic force corresponding to the amplitude modulation signal $V_N$ having the maximum amplitude $V_H$ is applied to the tactile presentation knob 3 that is in contact with the first electrode 102a and the second electrode 102b via dielectric layer 106. The amplitude modulation signal $V_N$ has a beat frequency corresponding to a difference between the first frequency and the second frequency. Therefore, when the tactile presentation knob 3 rotates on the tactile presentation screen 150, a frictional force acting on the tactile presentation knob 3 changes at the above-described beat frequency. As a result, the tactile presentation knob 3 vibrates at a beat frequency. The user perceives the vibration of the tactile presentation knob 3 as a tactile sense obtained from the tactile presentation screen 150. As described above, the tactile presentation screen 150 included in the tactile presentation panel 100 is configured to generate a tactile sense by changing a frictional force applied to the tactile presentation knob 3 by controlling an electrostatic force applied to the tactile presentation knob 3.

As described above, the amplitude modulation signal $V_N$ having a voltage approximately twice that of each of the input voltage signal $V_a$ (see FIG. 5) and the voltage signal $V_b$ (see FIG. 6) is generated. In this manner, the amplitude modulation signal $V_N$ necessary for exerting a desired frictional force on the tactile presentation knob 3 can thus be generated by the voltage signal $V_a$ (see FIG. 5) and the voltage signal $V_b$ (see FIG. 6) having a voltage of approximately ½ of the amplitude modulation signal $V_N$. Therefore, as compared with a case where an amplitude modulation signal is directly input to the first electrodes 102a and the second electrodes 102b, the same electrostatic force can be generated at a voltage of ½, and low-voltage driving can be performed.

In order to present a sufficiently large tactile sense to the user, the maximum amplitude $V_H$ only needs to be sufficiently large in a manner corresponding to the tactile sense, and the amplitude $V_L$ may be a small value as compared with that. Therefore, the amplitude $V_L$ itself does not need to be as large as generating a sufficiently large tactile sense. As a result of the amplitude $V_L$ being set in this way, in a state where only one of the first electrode 102a and the second electrode 102b is in contact with the tactile presentation knob 3, the user hardly perceives a tactile sense regardless of how the frequencies of the voltage signal $V_a$ and the voltage signal $V_b$ are selected.

In order to facilitate positioning of the tactile presentation knob 3 across the first electrode 102a and the second electrode 102b, a pitch $P_E$ of the tactile electrodes 102 is preferably smaller than a diameter $R_{NE}$ of the contact surface CT. This will be described later in detail.

<Touch Panel>

Figure 8:
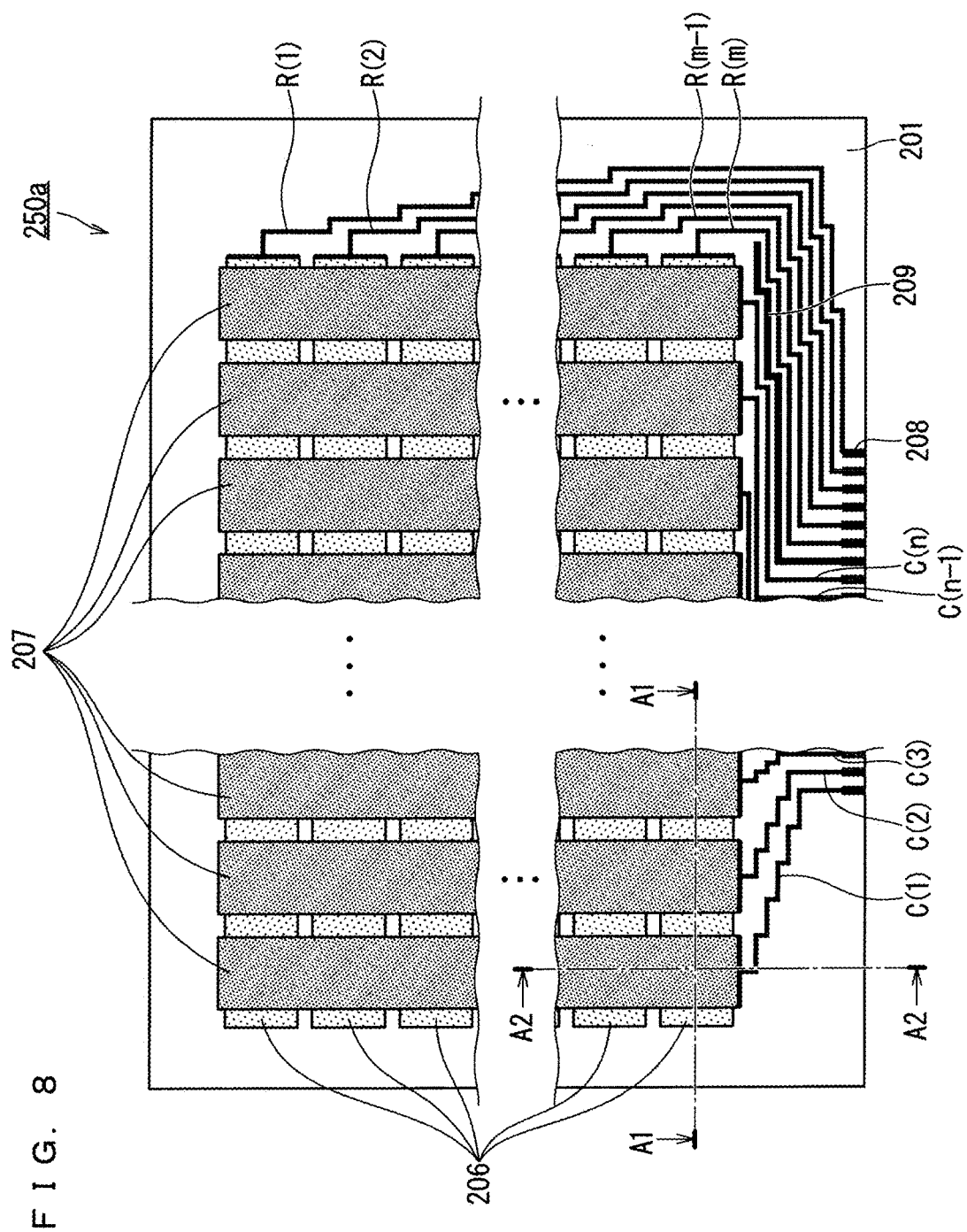
FIG. 8 is a plan view illustrating an example of a touch screen in FIG. 2.
Figure 9:
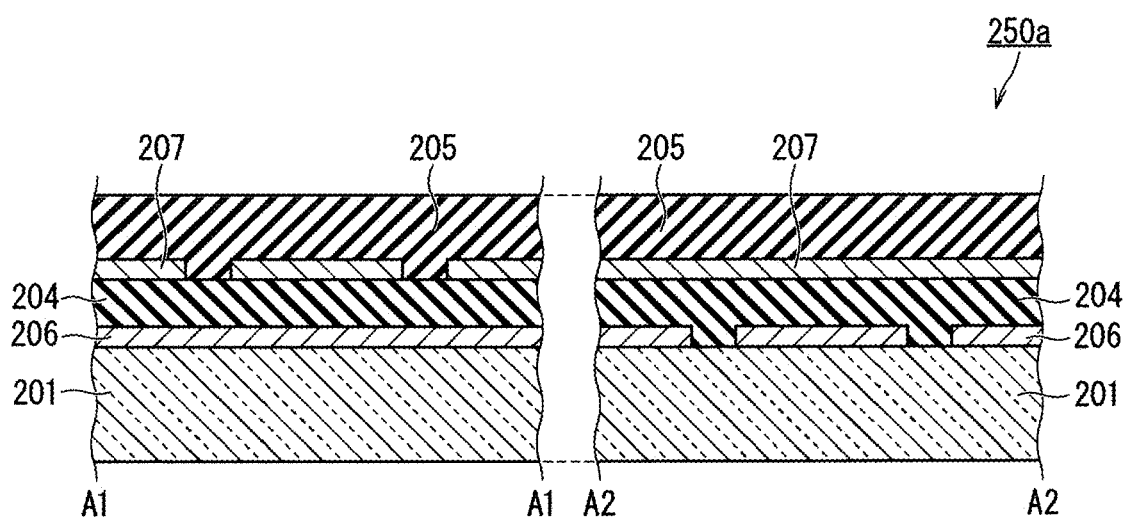
FIG. 9 is a partial cross-sectional view taken along line A1-A1 and line A2-A2 in FIG. 8.

FIG. 8 is a plan view illustrating a touch screen 250a of a capacitive sensing system as an example of the touch screen 250 (see FIG. 2). FIG. 9 is a partial cross-sectional view taken along line A1-A1 and line A2-A2 in FIG. 8.

The touch screen 250a includes a plurality of row direction wiring layers 206 and a plurality of column direction wiring layers 207. Each of the row direction wiring layers 206 includes a plurality of excitation electrodes 202 (see FIG. 2) electrically connected to each other, and each of the column direction wiring layers 207 includes a plurality of detection electrodes 203 (see FIG. 2) electrically connected to each other. In FIGS. 8 and 9, the row direction wiring layer 206 and the column direction wiring layer 207 are illustrated ignoring such a microstructure. The excitation electrode 202 (see FIG. 2) has a single layer film or a multilayer film of metal, or a multilayer structure including any of these and also using another conductive material. As the metal, for example, low resistance metal such as aluminum or silver is preferable. The same applies to the detection electrode 203 (see FIG. 2). By using metal as a wiring material, wiring resistance can be reduced. In contrast, a metal wiring, which is opaque, is easily visually recognized. In order to lower the visibility and increase the transmittance of the touch screen, a thin wire structure is preferably provided to the metal wiring. The thin wire structure is typically mesh-like.

Each of the row direction wiring layers 206 extends along the row direction (x direction in the diagram), and each of the column direction wiring layers 207 extends along the column direction (y direction in the diagram). A plurality of the row direction wiring layers 206 are arranged at intervals in the column direction, and a plurality of the column direction wiring layers 207 are arranged at intervals in the row direction. As illustrated in FIG. 8, in plan view, each of the row direction wiring layers 206 intersects a plurality of the column direction wiring layers 207, and each of the column direction wiring layers 207 intersects a plurality of the row direction wiring layers 206. The row direction wiring layer 206 and the column direction wiring layer 207 are insulated by the interlayer insulating layer 204.

The interlayer insulating layer 204 includes a single-layer film of an organic insulating film, a single-layer film of an inorganic insulating film, or a multilayer film. An inorganic insulating film is excellent for improving moisture resistance, and an organic insulating film is excellent for improving flatness. As the inorganic insulating film, for example, a transparent silicon-based inorganic insulating film such as a silicon oxide film, a silicon nitride film, or a silicon oxynitride film, or a transparent inorganic insulating film composed of a metal oxide such as alumina is used. As a material of the organic insulating film, a polymer material having a main chain composed of a silicon oxide, a silicon nitride film, or a silicon oxynitride film and having an organic substance bonded to a side chain or a functional group of the main chain, or thermosetting resin having a main chain composed of carbon can be used. Examples of the thermosetting resin include acrylic resin, polyimide resin, epoxy resin, novolak resin, and olefin resin.

Each of the row direction wiring layers 206 of the touch screen 250a is connected to a touch screen terminal portion 208 by lead-out wiring layers R(1) to R(m). Each of the column direction wiring layers 207 is connected to the touch screen terminal portion 208 by lead-out wiring layers C(1) to C(n). The touch screen terminal portion 208 is provided on an end portion of the substrate 201.

The lead-out wiring layers R(1) to R(m) are arranged outside a detectable area, and extend to corresponding electrodes in order from a layer closer to the center of the arrangement of the touch screen terminal portions 208 so as to obtain a substantially shortest distance. The lead-out wiring layers R(1) to R(m) are arranged as densely as possible while securing mutual insulation. The same applies to the lead-out wiring layers C(1) to C(n). With such arrangement, it is possible to suppress an area of a portion outside the detectable area of the substrate 201.

A shield wiring layer 209 may be provided between a group of the lead-out wiring layers R(1) to R(m) and a group of the lead-out wiring layers C(1) to C(n). In this manner, generation of noise in one of the groups due to the influence from the other is suppressed. Further, the influence of electromagnetic noise generated from the display panel 300 (see FIG. 2) on the lead-out wiring layer can be reduced. The shield wiring layer 209 may be formed of the same material as the row direction wiring layer 206 or the column direction wiring layer 207 at the same time.

The insulating layer 205 is provided on the substrate 201 so that the touch screen terminal portion 208 is exposed, and covers the row direction wiring layer 206, the column direction wiring layer 207, and the interlayer insulating layer 204. The insulating layer 205 can be formed of the same material as the interlayer insulating layer 204. In a case where the display panel 300 is a liquid crystal panel, an upper polarizing plate subjected to anti-glare treatment for the liquid crystal panel may be attached onto a portion through which light for display is transmitted of the insulating layer 205.

Figure 10:
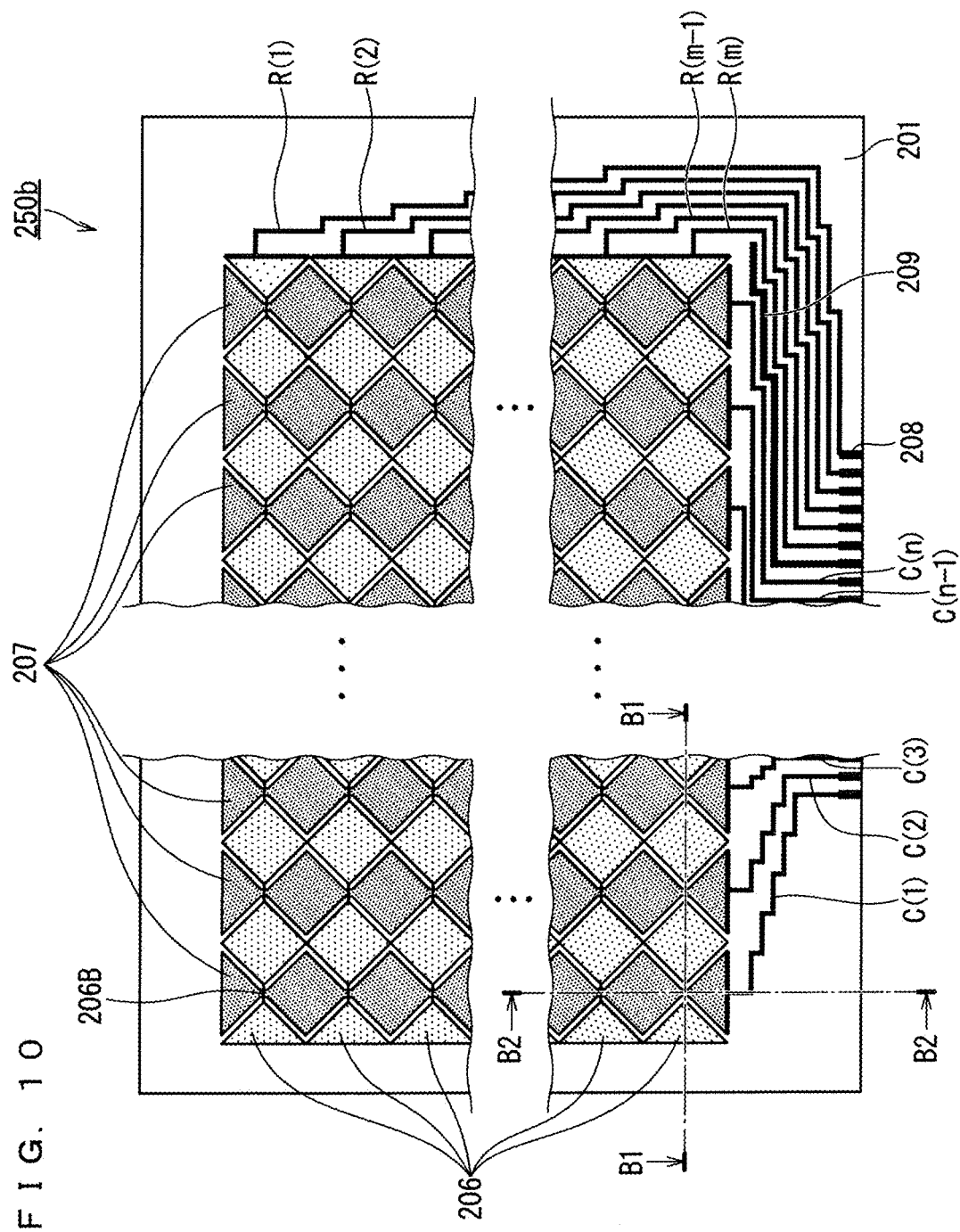
FIG. 10 is a plan view illustrating an example of the touch screen in FIG. 2.

FIG. 10 is a plan view illustrating a touch screen 250b of a capacitive sensing system as an example of the touch screen 250 (see FIG. 2). FIG. 11 is a partial cross-sectional view taken along line B1-B1 and line B2-B2 in FIG. 10. In the example of FIGS. 10 and 11, what is called a diamond structure is employed.

The row direction wiring layer 206 and the column direction wiring layer 207 are arranged on the same layer. Each of the column direction wiring layers 207 has a plurality of diamond-shaped electrodes connected to each other as the detection electrode 203. The row direction wiring layer 206 includes, as the excitation electrode 202, a plurality of diamond-shaped electrodes separated from each other, and a bridge 206B electrically connecting adjacent diamond-shaped electrodes. The interlayer insulating layer 204 is arranged so as to insulate the bridge 206B from the column direction wiring layer 207. Note that a bridge structure may be applied not to the row direction wiring layer but to the column direction wiring layer. Since electrical resistance of the wiring layer tends to become high as a bridge is formed, the bridge structure is preferably applied to a shorter one of the column direction wiring layer and the row direction wiring layer.

As a material of the row direction wiring layer 206 and the column direction wiring layer 207, for example, a transparent conductive film such as indium tin oxide (ITO) is used. Since ITO has translucency, the wiring layer is less likely to be visually recognized by the user. Since a transparent conductive film such as ITO has a relatively high electric resistance, the transparent conductive film is suitable for application to a small touch screen in which wiring resistance is not a problem. Further, since a transparent conductive film such as ITO is likely to have a wiring disconnected due to corrosion with another metal wiring, consideration for moisture resistance and waterproofness is required in order to prevent corrosion.

Note that, although the case where the structure of the touch screen and the structure of the display panel are independent is described above, they may be inseparably integrated. For example, in the case of what is called an on-cell touch panel, a touch screen is directly formed on a substrate (typically, a color filter substrate) of the display panel 300 without using the substrate 201. In a case of what is called an in-cell touch panel, a touch screen is formed between two transparent insulating substrates (not illustrated) included in the display panel 300.

<Tactile Presentation Panel>

Figure 12:
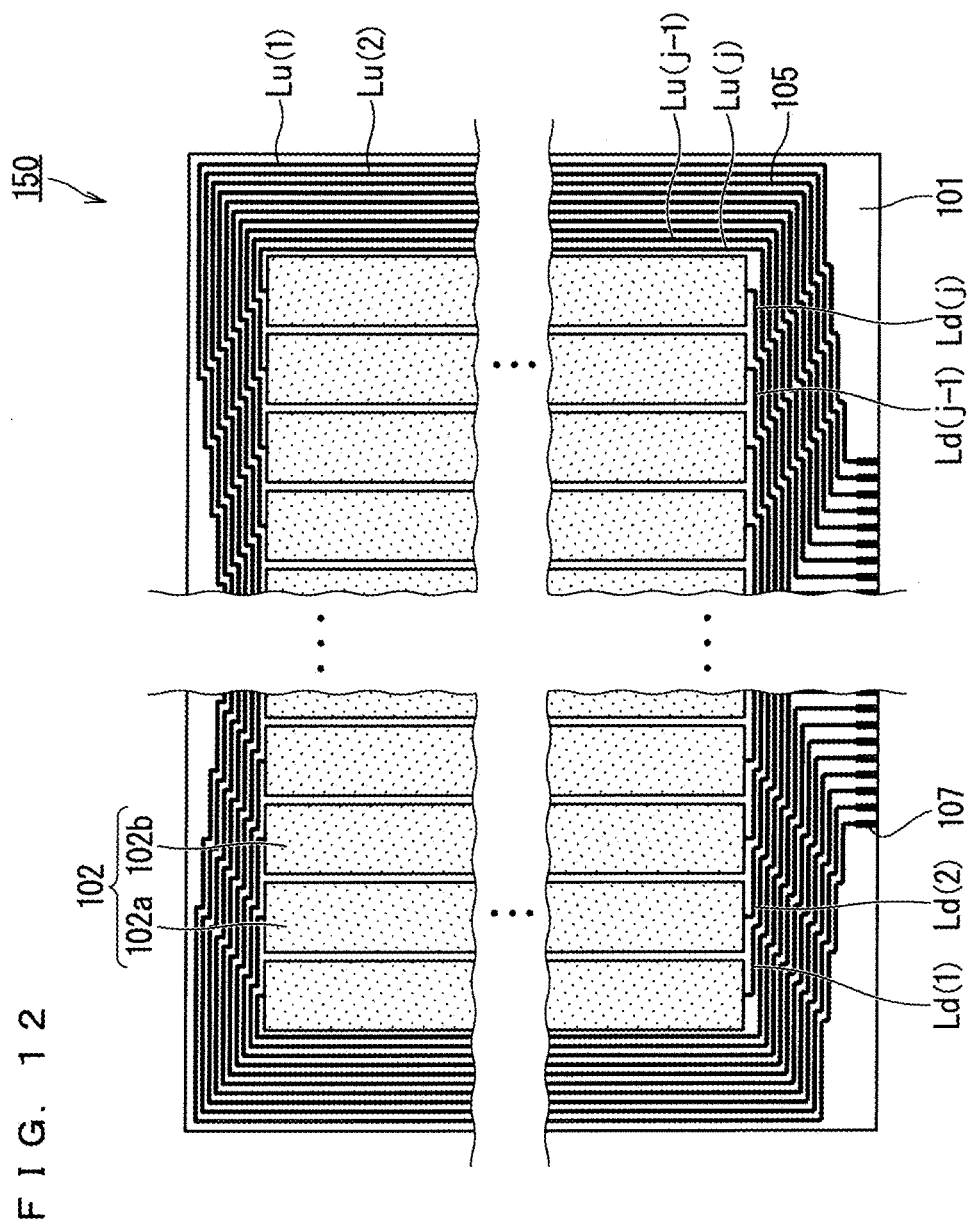
FIG. 12 is a plan view schematically illustrating a configuration of a tactile presentation screen of FIG. 2.

FIG. 12 is a plan view schematically illustrating a configuration of the tactile presentation screen 150. FIG. 13 is a schematic diagram illustrating formation of the electrostatic capacitance $C_{NE}$ between the tactile electrode 102 and the tactile presentation knob 3.

As described above, the tactile presentation screen 150 includes the transparent insulating substrate 101, the tactile electrode 102, and the dielectric layer 106. Furthermore, a tactile presentation panel terminal portion 107 is provided in an end portion of the transparent insulating substrate 101, and a plurality of lead-out wiring layers 105 are arranged on the transparent insulating substrate. The dielectric layer 106 is provided such that the tactile presentation panel terminal portion 107 is exposed. The tactile electrode 102 is connected to the tactile presentation panel terminal portion 107 via the lead-out wiring layer 105. The voltage supply circuit 110 (see FIG. 2) is connected to the tactile presentation panel terminal portion 107 via the FPC 108 (see FIG. 1). Note that details of the lead-out wiring layer 105 will be described later.

Each of the tactile electrodes 102 extends along the extending direction (longitudinal direction in FIG. 12). A plurality of the tactile electrodes 102 are arranged at intervals along the arrangement direction (lateral direction in FIG. 12). In the example of FIG. 12, the transparent insulating substrate 101 has a rectangular shape having long sides and short sides. Therefore, the tactile presentation screen 150 also has long sides and short sides corresponding to the transparent insulating substrate 101. In the example of FIG. 12, the arrangement direction is along the long side. In a case where the horizontal direction of the tactile presentation screen 150 as viewed by the viewer is along the long side, the arrangement direction is along the horizontal direction.

The larger the electrostatic capacitance $C_{NE}$ formed between the tactile electrode 102 and the tactile presentation knob 3 is, the stronger a tactile sense can be presented. From this viewpoint, it is preferable that the area of the tactile electrode 102 is large. In a case where priority is given to the size of the area of the tactile electrode 102, it is difficult to make the tactile electrode 102 less likely to be visually recognized due to imparting of a microstructure to the tactile electrode 102. In order to make the tactile electrode 102 less likely to be visually recognized while making the area of the tactile electrode 102 large, the tactile electrode 102 may be formed of a transparent conductive film. A typical material of the transparent conductive film is ITO. Since a transparent conductive film such as ITO has a relatively high electric resistance as compared with metal, the transparent conductive film is suitable for application to a small touch screen in which wiring resistance is not a problem. When application to a large touch screen where wiring resistance is a problem is necessary, the ITO film thickness is made large or the content of a dopant is increased to reduce the resistivity. In this case, since a light absorption rate of ITO may change and the touch screen may appear colored, it may be necessary to adjust the color tone of the display. Further, since a transparent conductive film such as ITO is likely to have a wiring disconnected due to corrosion with another metal wiring, consideration for moisture resistance and waterproofness is required in order to prevent corrosion in a case where wiring resistance of the electrode is lowered by a lamination structure of with other metal.

Instead of using the transparent conductive film as described above, the tactile electrode 102 may be a single layer film or a multilayer film of metal, or an electrode (hereinafter, also referred to as "metal film-containing electrode") having a multilayer structure including any of these and also using another conductive material. As the metal, for example, low resistance metal such as aluminum or silver is preferable. By using the metal film-containing electrode, wiring resistance can be reduced. In contrast, a metal film, which is opaque, is easily visually recognized. Therefore, in order to make the metal film less likely to be visually recognized, a thin wire structure may be imparted to the metal film-containing electrode. The thin wire structure is typically mesh-like.

The dielectric layer 106 includes a single-layer film of an organic insulating film, a single-layer film of an inorganic insulating film, or a multilayer film. In a case of a multilayer film, different types of organic insulating films may be laminated, or different types of inorganic insulating films may be laminated, or an organic insulating film and an inorganic insulating film may be laminated. The inorganic insulating film has high moisture impermeability, high hardness, and high abrasion resistance. Since the tactile presentation knob 3 rotates on the dielectric layer 106, the dielectric layer 106 requires high abrasion resistance. The organic insulating film is preferable for obtaining high flatness, but has low hardness and low abrasion resistance. For this reason, in order to obtain both high flatness and high abrasion resistance, it is preferable to form the inorganic insulating film on the organic insulating film. As the inorganic insulating film, for example, a transparent silicon-based inorganic insulating film such as a silicon oxide film, a silicon nitride film, or a silicon oxynitride film, or a transparent inorganic insulating film composed of a metal oxide such as alumina is used. As a material of the organic insulating film, a polymer material having a main chain composed of a silicon oxide, a silicon nitride film, or a silicon oxynitride film and having an organic substance bonded to a side chain or a functional group of the main chain, or thermosetting resin having a main chain composed of carbon can be used. Examples of the thermosetting resin include acrylic resin, polyimide resin, epoxy resin, novolak resin, and olefin resin.

The electrostatic capacitance $C_{NE}$ is represented by Equation (1) below.

$$C_{NE}=Q/V=\varepsilon S/d \quad (1)$$

Here, Q is a charge amount stored in each of a conductive elastic portion 6 and the tactile electrode 102, V is a voltage between the tactile presentation knob 3 and the tactile electrode 102, ε is a dielectric constant of the dielectric layer 106, S is a contact area between the conductive elastic portion 6 and the tactile electrode 102 via the dielectric layer 106, and d is a thickness of the dielectric layer 106. The electrostatic capacitance $C_{NE}$ is proportional to the dielectric constants and is inversely proportional to the film thickness d.

From Equation (1) above, the dielectric constant ε is preferably high in order to make the electrostatic capacitance $C_{NE}$ large. Specifically, the dielectric layer 106 preferably includes a film (hereinafter, also referred to as a "high dielectric constant insulating film") having a relative dielectric constant of 10 or more. In the high dielectric constant insulating film, a state in which positive and negative charges are displaced into a material by an electric field applied from the outside occurs (this is generally referred to as dielectric polarization). In the dielectric polarization, charges (generally referred to as polarization charges) generated by polarization are maintained while voltage is held, and when the voltage decreases, the polarization charges decrease and the dielectric polarization decreases, and when the applied voltage is set to zero volt, the dielectric polarization also disappears. The direction of the dielectric polarization can be changed by an electric field. The high dielectric constant insulating film may be used as a single layer, or may be used as a multilayer film by being laminated with another inorganic insulating film or organic insulating film of a low dielectric constant, or another high dielectric constant insulating film. In general, since a refractive index is higher as a dielectric constant is higher, a lamination structure of a high refractive index film and a low refractive index film is obtained as a high dielectric constant insulating film and a low dielectric constant insulating film are laminated. With this lamination structure, the dielectric layer 106 can also function as an antireflection film.

Further, from Equation (1) above, the thickness d is preferably small in order to make the electrostatic capacitance $C_{NE}$ large. By laminating a high dielectric constant insulating film and an organic insulating film, the film thickness of the organic insulating film can be reduced while sufficient insulation is secured. In this manner, the thickness d of the dielectric layer 106 can be reduced.

Assuming that the tactile electrode has a matrix structure (that is, a structure having an X electrode and a Y electrode crossing each other) (see, for example, Japanese Patent Application Laid-Open No. 2015-097076), a step, that is, unevenness is generated at an intersection between the X electrode and the Y electrode. This unevenness is flattened if the thickness of the insulating layer covering the unevenness is large. However, the thickness of the insulating layer is limited in order to avoid an excessive decrease in the electrostatic capacitance $C_{NE}$. For this reason, unevenness may occur on a front surface of the tactile presentation screen. When the texture feeling of the unevenness is mixed with the texture feeling caused by an electrostatic force from the tactile electrode, it is difficult to give an intended texture feeling to the user. In a case where an organic insulating film having an effect of flattening a surface shape is used as the dielectric layer 106, although occurrence of the unevenness is avoided, a large thickness is required to some extent for flattening, and a decrease in the electrostatic capacitance $C_{NE}$ cannot be avoided.

In contrast, according to the first embodiment, since the tactile electrode 102 has no intersection, the size of the unevenness can be suppressed to about the thickness of the tactile electrode 102. This makes it possible to thin the organic film having a flattening effect or to apply a high dielectric constant insulating film having a low flattening effect. In this manner, the electrostatic capacitance $C_{NE}$ can be made larger than that in the case of the matrix structure. Further, since a contact surface with the tactile presentation knob 3 of the tactile presentation screen 150 has less unevenness, a tactile sense caused by surface unevenness is not given to the tactile presentation knob 3 when signal voltage is not applied. For this reason, a tactile sense of the tactile presentation knob 3 when signal voltage is applied becomes clearer.

Further, even if the electrostatic capacitance $C_{NE}$ is the same, if the tactile presentation knob 3 is slippery on the dielectric layer 106, a change in an electrostatic force between the tactile presentation knob 3 and the tactile electrode 102 is easily perceived by the user as a change in a frictional force. In this manner, a larger tactile sense can be given to the user. In order to make the tactile presentation knob 3 slippery on the dielectric layer 106, it is necessary to suppress adhesion between the dielectric layer 106 and the tactile presentation knob 3. For this purpose, for example, a film having higher water repellency than the inside of the dielectric layer 106 may be provided on an outermost surface of the dielectric layer 106, on a contact surface with the dielectric layer 106 of the conductive elastic portion 6, or both.

<Electrode Pitch>

FIG. 14 is a schematic diagram for explaining the electrostatic capacitance $C_{NE}$ formed between the tactile electrode 102 and the tactile presentation knob 3 in a case where the pitch $P_E$ of the tactile electrode 102 is larger than a diameter $R_{FE}$ of the tactile presentation knob 3. FIG. 15 is a schematic diagram for explaining the electrostatic capacitance $C_{NE}$ formed between the tactile electrode 102 and the tactile presentation knob 3 in a case where the pitch $P_E$ of the tactile electrode 102 is smaller than the diameter $R_{FE}$.

Figure 16:
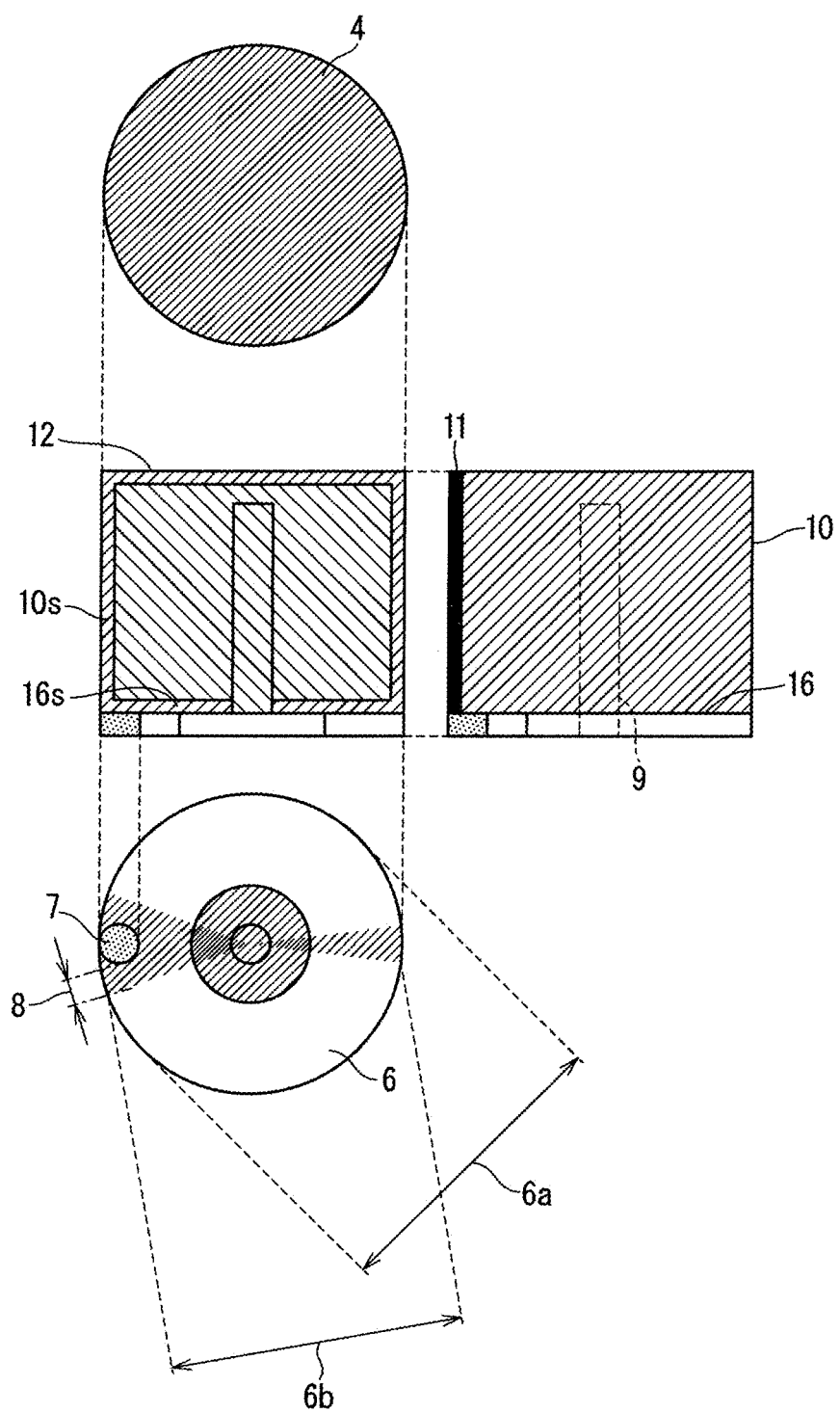
FIG. 16 is a schematic view illustrating a configuration of a rotation portion of the tactile presentation knob according to the first embodiment of the present invention.

In the first embodiment, as described above, an electrostatic force corresponding to the amplitude modulation signal $V_N$ (see FIG. 7) is generated by applying the voltage signal $V_a$ (see FIG. 5) and the voltage signal $V_b$ (see FIG. 6) having different frequencies to the first electrode 102a and the second electrode 102b adjacent to each other. In this manner, a frictional force between the dielectric layer 106 and the tactile presentation knob 3 changes in accordance with a beat frequency of the amplitude modulation signal $V_N$, and the user perceives this change as a tactile sense. In the state illustrated in FIG. 14, only the voltage signal $V_a$ acts on the tactile presentation knob 3, and the voltage signal $V_b$ does not act on the tactile presentation knob 3. Therefore, the amplitude modulation signal $V_N$ is not generated, and a tactile sense is not generated. In contrast, in a case where the tactile presentation knob 3 is located above the boundary between the first electrode 102a and the second electrode 102b, a tactile sense is generated. Therefore, in the configuration of FIG. 14, depending on the position of the tactile presentation knob 3, there are a position where a tactile sense is generated and a position where a tactile sense is not generated. In contrast, in the state illustrated in FIG. 15, both the voltage signal $V_a$ and the voltage signal $V_b$ act on the tactile presentation knob 3 regardless of the position of the tactile presentation knob 3. In this manner, the amplitude modulation signal $V_N$ is generated. Therefore, in the configuration of FIG. 15, a tactile sense can be felt regardless of the position of the tactile presentation knob 3, and the position of the tactile presentation knob 3 can be optionally set. That is, in order that the tactile presentation knob 3 is likely to be positioned so as to be across the first electrode 102a and the second electrode 102b, for example, as illustrated in FIG. 16 to be described later, in a case where the conductive elastic portion 6 is divided, a width 6b of the conductive elastic portion 6 is preferably larger than the pitch $P_E$ of the tactile electrodes 102. Further, in a case where the conductive elastic portion 6 is not divided, an outer diameter 6a of the conductive elastic portion 6 is preferably larger than the pitch $P_E$ of the tactile electrodes 102.

<Structure of Tactile Presentation Knob>

Figure 17:
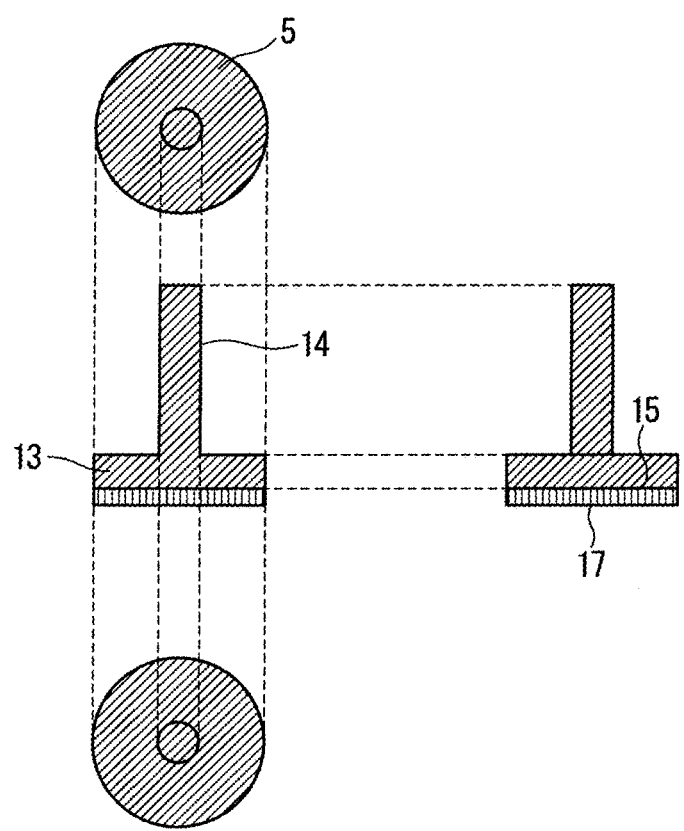
FIG. 17 is a schematic view illustrating a configuration of a fixing portion in a case where a position where the tactile presentation knob according to the first embodiment of the present invention is placed is fixed at one place.

FIG. 16 is a schematic diagram illustrating a structure of a rotation portion 4 of the tactile presentation knob 3. FIG. 17 is a schematic diagram of a fixing portion 5 when the rotation portion 4 is placed on a contact surface of the tactile presentation panel 100 and rotated in a case where the position where the tactile presentation knob 3 is placed is fixed at one position. The rotation portion 4 and the fixing portion 5 are both made from metal such as aluminum, SUS, or copper, and resin such as polyvinyl chloride, polystyrene, ABS resin, AS resin, acrylic resin, polyethylene, polypropylene, polyvinyl alcohol, polyvinylidene chloride, polyethylene terephthalate, polycarbonate, modified polyphenylene ether, polyamide, polybutylene terephthalate, polyacetal, ultrahigh molecular weight polyethylene, polyarylate, polysulfone, polyethersulfone, polyamideimide, polyetherimide, thermoplastic polyimide, polyphenylene sulfide, liquid crystalline polymer, polyetheretherketone, or fluororesin, and an operational feeling and a tactile sense are changed by the weight of the tactile presentation knob 3. Therefore, the materials are selected according to the user's preference, the use environment of the tactile presentation knob 3, the purpose of use, and the like. Since a rotation portion side surface 10 needs to be electrically connected to the conductive elastic portion 6 and an indicator 2, a rotation portion side surface conductive portion 10s in contact with the indicator 2 of the rotation portion side surface 10 and a boundary portion conductive portion 16s are made from metal or a conductive resin material (resistance is desirably $10^3 \Omega$ or less).

The tactile presentation knob 3 has the same columnar shape as the shape of a shaft portion 14 and the shape of a hole portion of a fixing hole 9, and is formed by integrally inserting the shaft portion 14 of the fixing portion 5 into the fixing hole 9 of the rotation portion. A gap between the shaft portion 14 and the fixing hole 9 is desirably as narrow as possible within a range in which the rotation portion 4 smoothly turns. When the gap between the shaft portion 14 and the fixing hole 9 is narrow, a fluctuation of a rotation shaft when the tactile presentation knob 3 is rotated becomes small, and a tactile sense different from a tactile sense originally supposed to be given to the tactile presentation knob 3, such as a shake and vibration of the rotation portion 4 caused by the fluctuation of the rotation shaft, given to the indicator 2 is suppressed, and a tactile sense imparted to the user becomes clearer. In order for the rotation portion 4 to rotate smoothly, a surface of the shaft portion 14 and a surface of an inner surface portion of the fixing hole 9 desirably have as less unevenness as possible, and surface roughness Ra is desirably 0.5 µm or less. An inner diameter dimensional tolerance of the fixing hole 9 is desirably 0 to +0.5 mm, and an outer diameter tolerance of the shaft portion 14 is desirably −0.0005 mm.

The fixing portion 5 is a portion serving as a rotation shaft when the rotation portion 4 rotates, and serves to maintain parallelism such that an operation surface of the tactile presentation panel 100 and the conductive elastic portion 6 are in horizontal surface contact with each other. For this reason, a bottom surface portion 15 of the fixing portion 5 is flat, the center of the shaft portion 14 is orthogonal to the bottom surface portion 15, and a contact surface with the tactile presentation panel 100 of the conductive elastic portion 6 and the bottom surface portion 15 are located on the same plane.

In a case where the position where the tactile presentation knob 3 is placed on the tactile presentation panel 100 is changed during operation or for each operation, the bottom surface portion 15 may be bonded and fixed onto the tactile presentation panel 100. Further, in a case where the position where the tactile presentation knob 3 is placed on the tactile presentation panel 100 is not changed during operation or for each operation (in a case where the position of the tactile presentation knob 3 is fixed and used), the bottom surface portion 15 may be bonded and fixed onto the tactile presentation panel 100 by an adhesive portion 17.

The rotation portion side surface conductive portion 10s and the boundary portion conductive portion 16s on a surface of the side surface 10 of the rotation portion 4 with which the indicator 2 is in contact when the rotation portion 4 is rotated are composed of a conductive material, and are also electrically connected to the conductive elastic portion 6 and a position detection unit 7. Whether or not the user is in contact with a surface of the rotation portion 4 is detected, and accumulation of electric charges in the conductive elastic portion 6 is suppressed. The rotation portion side surface conductive portion 10s and the boundary portion conductive portion 16s are composed of the same material as the conductive elastic portion 6. In particular, it is desirable to use metal having low resistance, and the rotation portion side surface conductive portion 10s and the boundary portion conductive portion 16s may be formed by forming the rotation portion 4 with resin or the like and then performing coating with metal plating or the like. Details will be described later.

The conductive elastic portion 6 is a conductor that forms electrostatic capacitance with the tactile electrode 102. The conductive elastic portion 6 is divided into two or more portions, and prevents a decrease in tactile strength. Details of this effect will be described later. Since the conductive elastic portion 6 has elasticity, there is an effect of suppressing a decrease in tactile strength due to a decrease in adhesion. When the adhesion between the conductive elastic portion 6 and a surface of the tactile presentation panel decreases due to a decrease in flatness or unevenness caused by processing accuracy of the rotation portion 4 or the fixing portion 5 or assembly accuracy of the tactile presentation screen 150, minute unevenness on a surface of the tactile presentation panel 100, or the like, the tactile electrode 102 and the conductive elastic portion 6 form electrostatic capacitance not only via the dielectric layer but also via air having a small dielectric constant, and the electrostatic capacitance formed between the tactile electrode 102 and the conductive elastic portion 6 decreases, resulting in a decrease in tactile strength. Since the conductive elastic portion 6 has elasticity, a gap between the dielectric layer and the conductive elastic portion 6 due to unevenness is filled, and it is possible to prevent a decrease in tactile strength due to a decrease in adhesion. A material used for the conductive elastic portion 6 is preferably an elastic resin material called conductive rubber obtained by mixing a conductive substance such as conductive carbon black or metal powder with CNR, CR rubber, NBR rubber, silicon, fluororubber, EPT rubber, SBR, butyl rubber, acrylic rubber, or CSM rubber as a base material. Volume resistivity only needs to be $10^6$ Ωcm or less, and as the volume resistivity is lower, electric charges are less likely to accumulate in the conductive elastic portion 6. Details of charge accumulation in the conductive elastic portion 6 will be described later. Further, since electrostatic capacitance is formed with the tactile electrode 102, a withstand voltage characteristic is desirably as high as possible because the life and reliability of the conductive elastic portion 6 are improved. The position detection unit 7 forms electrostatic capacitance with the detection electrode 203 of the touch screen 250, and is used to detect a position and a rotation amount of the tactile presentation knob 3.

A material that forms the position detection unit 7 is a conductor capable of forming electrostatic capacitance with the detection electrode 203, has elasticity similarly to the conductive elastic portion 6, and may be the same material as the conductive elastic portion 6. The better the adhesion with the tactile presentation panel 100, the less a difference between a design value and an actual capacitance value is likely to occur, and stable position detection accuracy can be obtained.

When the conductive elastic portion 6 and the position detection unit 7 have the same thickness so as to be in close contact with a surface of the tactile presentation panel 100 without forming a gap between them, high tactile strength and highly accurate position detection can be obtained. A flatness (a difference between a maximum value and a minimum value of measured values obtained by measuring a distance from a reference surface) of a surface where the conductive elastic portion 6 and the position detection unit 7 are in contact with the tactile presentation panel 100 is desirably 0.5 mm or less. Further, since a diameter of a contact area of a finger of a person with respect to a touch surface when a touch panel is operated said to be about 3 mm for a child and about 7 to 10 mm at the maximum for an adult, and a contact area of a finger in various touch operations is generally said to be 20 to 1000 mm², an area of the position detection unit 7 may be considered to be within a range of an area obtained from these values.

<Detection of Knob Position and Rotation Amount>

Figure 18:
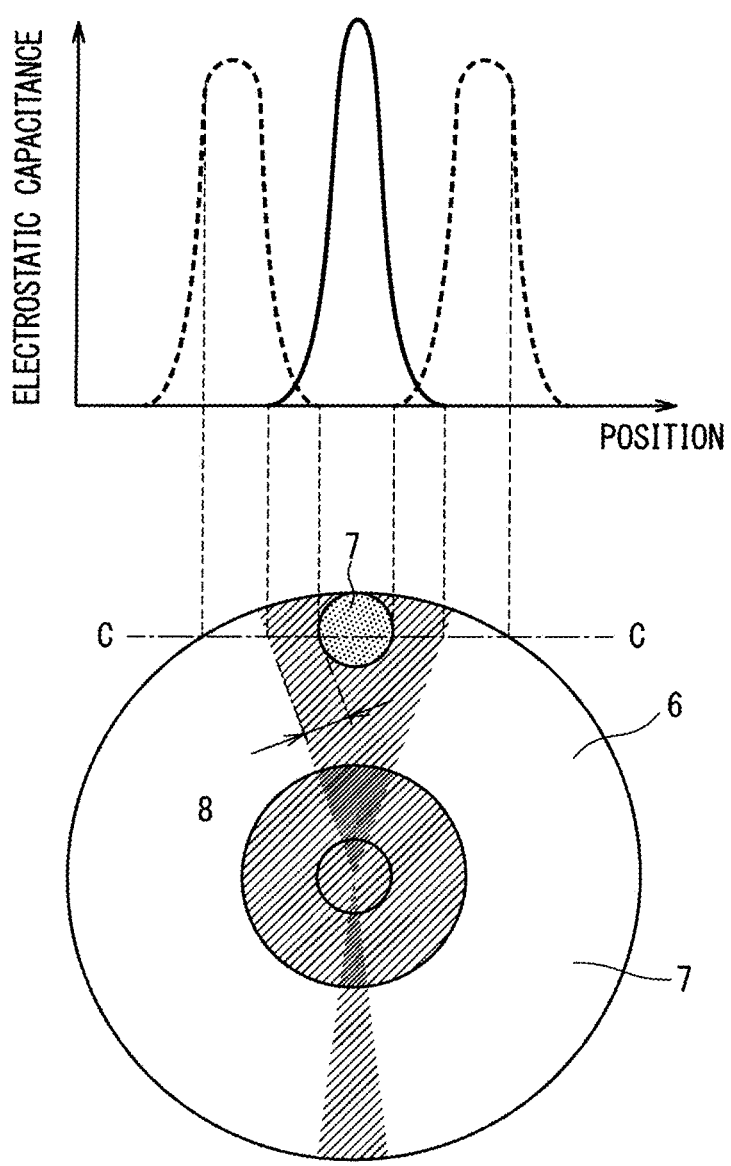
FIG. 18 is a schematic diagram for explaining a capacitance profile of line C-C when the touch screen according to the first embodiment of the present invention detects the position of the tactile presentation knob.

FIG. 18 is a schematic diagram illustrating a capacitance profile of line C-C when the touch panel 200 performs detection at the time of position detection of the tactile presentation knob 3. Generation of a tactile sense on the tactile presentation knob 3 and the position detection of the tactile presentation knob 3 are performed by time division. During a period in which a signal voltage is applied to the tactile electrode 102, the detection electrode 203 and the excitation electrode 202 apply an optional voltage so as not to cause a voltage drop on the tactile electrode 102 by forming electrostatic capacitance with the tactile electrode 102, or 0 V. When the detection electrode 203 performs position detection, the tactile electrode 102 is placed in a floating state, and the conductive elastic portion 6 and the detection electrode 203 form electrostatic capacitance via the tactile electrode 102 to detect a change amount in electrostatic capacitance between the excitation electrode 202 and the detection electrode 203, so that the position of the tactile presentation knob 3 is detected.

The detection electrode 203 forms electrostatic capacitance with both the position detection unit 7 and the conductive elastic portion 6 to detect the electrostatic capacitance. At this time, since there is a gap 8, an electrostatic capacitance profile with the position detection unit 7 and an electrostatic capacitance profile with the conductive elastic portion 6 have peaks at different positions, and these positions are distinguished from each other.

For a rotation amount of the tactile presentation knob 3, in a case where the number of the position detection units 7 is one, the position detection unit 7 is arranged immediately below an indication position line 11 indicating an indication position of the knob, and the rotation amount is calculated from a movement amount of the position detection unit 7. The number of the position detection units 7 is not necessarily one. In a case where the number of position detection units 7 is an even number, if only the position detection unit 7 located immediately below the indication position line 11 has a different area from the other position detection units 7, the indication position of the tactile presentation knob 3 can be detected. In a case where the number of the position detection units 7 is an odd number, if an operation range of the knob is less than 360 degrees, the indication position and a rotation angle can be calculated from a positional relationship of the position detection unit 7. When the number of the position detection units 7 is large, an area of the conductive elastic portion 6 is small, and thus the number of the position detection units is determined in balance with tactile strength.

<Inter-Electrode Distance>

Figure 19:
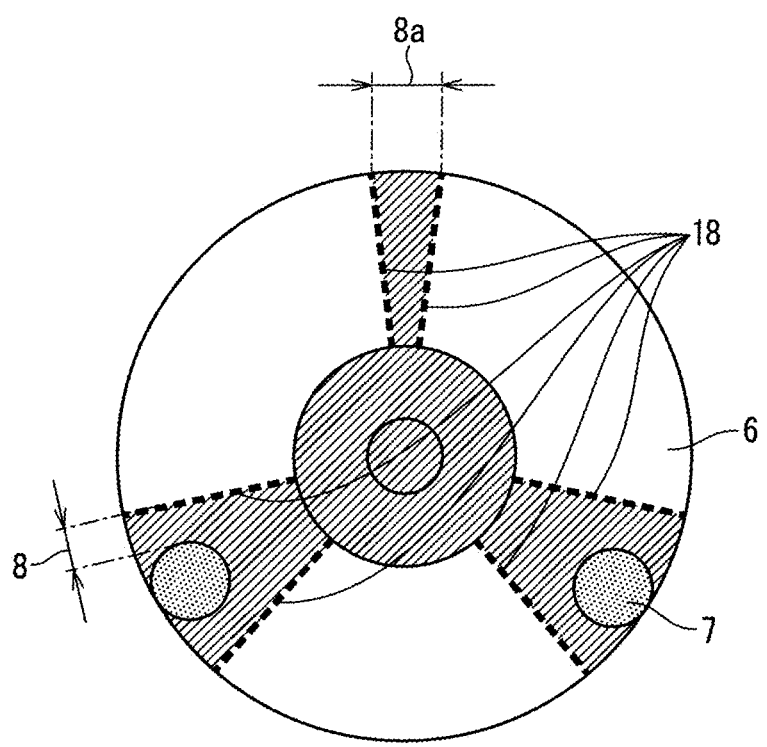
FIG. 19 is a schematic view illustrating a configuration of an edge portion of a conductive elastic portion according to the first embodiment of the present invention.

FIG. 19 illustrates an example of a positional relationship between the conductive elastic portion 6 and the position detection unit 7 in the tactile presentation knob 3. A distance between the conductive elastic portion 6 and the position detection unit 7 in a case where the position detection unit 7 is arranged between the conductive elastic portions 6 adjacent to each other is indicated by the gap 8, and a distance between the conductive elastic portions 6 in a case where the position detection unit 7 is not arranged between the conductive elastic portions 6 adjacent to each other is indicated by a gap 8a. In a case where unevenness caused by thickness of the electrode is present on a surface of the tactile presentation panel 100, when the conductive elastic portion 6 slides while being in contact with the tactile electrode 102 via the dielectric layer 106, the tactile presentation knob 3 vibrates due to the unevenness on the surface. This vibration is sensed by the indicator 2 independently of a voltage signal applied to the tactile electrode 102.

As a result, the indicator 2 may be less likely to feel a tactile sense obtained by the voltage signal. In other words, the tactile strength may be decreased.

Even if there is unevenness on the surface of the tactile presentation panel 100, whether or not the indicator 2 can easily feel the unevenness depends on an inter-electrode interval of the tactile electrodes 102 as described later. As larger unevenness is allowed, the need for increasing the thickness of the dielectric layer 106 to alleviate the unevenness is lowered. That is, it is allowed to reduce the thickness of the dielectric layer 106. This makes it possible to increase the capacitance formed between the conductive elastic portion 6 and the tactile electrode 102. Therefore, a stronger tactile sense can be generated. Further, if an inter-electrode distance of the tactile electrode 102 is wider than the gap 8 between the conductive elastic portion 6 and the position detection unit 7, an edge portion 18 (see FIG. 19) of the conductive elastic portion 6 is caught by the unevenness on the surface caused by the inter-electrode distance of the tactile electrode 102, and an unintended tactile sense occurs in the tactile presentation knob 3. Therefore, the inter-electrode distance of the tactile electrode 102 is desirably narrower than the gap 8. Further, the narrower the inter-electrode distance of the tactile electrode 102 is, the larger an occupied area of the tactile electrode 102 becomes, the larger the electrostatic capacitance formed with the conductive elastic portion 6 becomes, and the larger the obtained tactile strength becomes, which is desirable.

<Detailed Configuration of Tactile Presentation Touch Panel>

Figure 20:
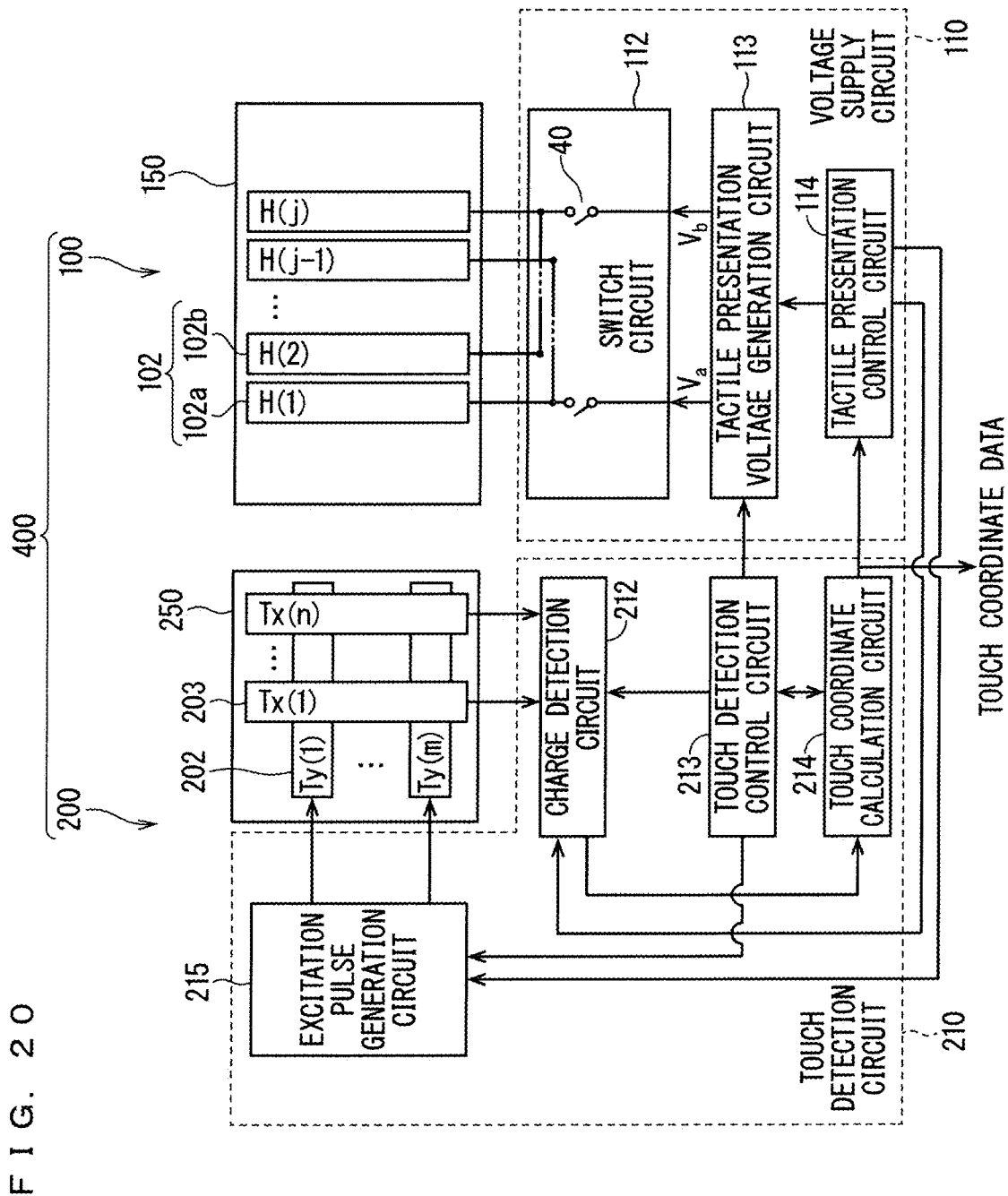
FIG. 20 is a block diagram schematically illustrating a configuration of a tactile presentation touch panel of FIG. 1.

FIG. 20 is a block diagram schematically illustrating a configuration of the tactile presentation touch panel 400. Here, it is assumed that excitation electrodes Ty(1) to Ty(m) are provided as a plurality of the excitation electrodes 202, detection electrodes Tx(1) to Tx(n) are provided as a plurality of the detection electrodes 203, and tactile electrodes H(1) to H(j) are provided as a plurality of the tactile electrodes 102. The tactile electrodes H(1) to H(n) are arranged in order according to the number in parentheses, the odd-numbered tactile electrode 102 corresponds to the first electrode 102a, and the even-numbered tactile electrode 102 corresponds to the second electrode 102b. Further, in order to simplify the description, it is assumed that one of the excitation electrode 202 constitutes one of the row direction wiring layer 206 (see FIG. 8 or 10), and one of the detection electrode 203 constitutes one of the column direction wiring layer 207 (see FIG. 8 or 10).

As described above, the tactile presentation touch panel 400 includes the touch panel 200 and the tactile presentation panel 100. The touch panel 200 includes a touch screen 250 and a touch detection circuit 210. The tactile presentation panel 100 includes a tactile presentation screen 150 and a voltage supply circuit 110.

The touch detection circuit 210 includes an excitation pulse generation circuit 215, a charge detection circuit 212, a touch coordinate calculation circuit 214, and a touch detection control circuit 213. The touch detection control circuit 213 controls operation of the excitation pulse generation circuit 215, the charge detection circuit 212, and the touch coordinate calculation circuit 214. The excitation pulse generation circuit 215 sequentially applies an excitation pulse signal to the excitation electrodes Ty(1) to Ty(m). The charge detection circuit 212 measures a signal obtained from each of the detection electrodes Tx(1) to Tx(n). In this manner, the charge detection circuit 212 detects a charge amount of each of the detection electrodes Tx(1) to Tx(n). Information of a charge detection result indicates a value corresponding to mutual capacitance between the excitation electrode Ty(k) and each of the detection electrodes Tx(1) to Tx(n) when an excitation pulse signal is applied to the excitation electrode Ty(k), where k is an integer of 1 or more and m or less. Note that the charge detection circuit 212 can recognize to which of the excitation electrodes Ty(1) to Ty(m) an excitation pulse signal is applied by a control signal from the touch detection control circuit 213. The touch coordinate calculation circuit 214 obtains data (hereinafter, referred to as "touch coordinate data") of coordinates touched by the indicator 2 on the basis of the charge detection result. The touch coordinate data is output to the outside of the tactile presentation touch panel 400, and is also output to the voltage supply circuit 110 of the tactile presentation panel 100.

The voltage supply circuit 110 includes a switch circuit 112, the tactile presentation voltage generation circuit 113, and a tactile presentation control circuit 114. The tactile presentation voltage generation circuit 113 applies the voltage signal $V_a$ to the first electrode 102a and applies the voltage signal $V_b$ to the second electrode 102b among the tactile electrodes H(1) to H(j) via the switch circuit 112. In other words, the voltage signal $V_a$ and the voltage signal $V_b$ are alternately applied to the tactile electrodes H(1) to H(j) arranged in one direction (lateral direction in the diagram). The switch circuit 112 is set to an on state or an off state on the basis of a command from the tactile presentation voltage generation circuit 113. The switch circuit 112 connects the tactile electrode 102 to the tactile presentation voltage generation circuit 113 in the on state, and brings the tactile electrode 102 into a floating state in the off state. In the first embodiment, the switch circuit 112 includes two switches 40, one of which performs switching of an electrical path to all the first electrodes 102a, and the other of which performs switching of an electrical path to all the second electrodes 102b. These two of the switches 40 may be controlled in conjunction with each other. Note that the switch 40 corresponds to a switching unit.

The tactile presentation control circuit 114 refers to information of the touch coordinate data detected by the touch detection circuit 210. The tactile presentation control circuit 114 may control operation of the tactile presentation voltage generation circuit 113 based on this information. That is, the touch detection circuit 210 functions as a contact detection unit that detects contact of the user with the tactile presentation knob 3.

<Operation of Tactile Presentation Touch Panel>

Figure 22:
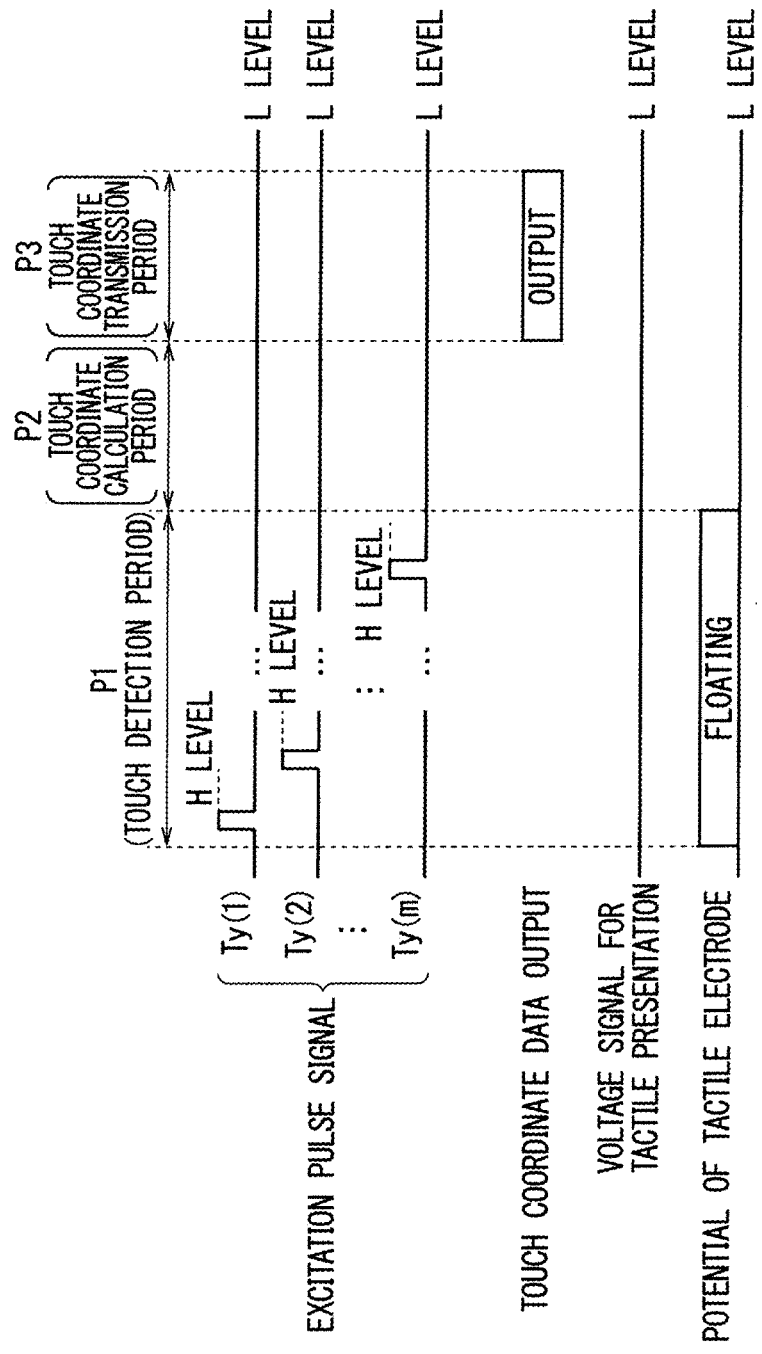
FIG. 22 is a timing chart schematically illustrating an operation timing of the tactile presentation touch panel of FIG. 1 when the indicator is not in contact with the tactile presentation knob.

FIG. 21 is a schematic diagram illustrating an image of electrostatic capacitance between the excitation electrode 202 and the detection electrode 203 when the indicator 2 is not in contact with the tactile presentation knob 3. FIG. 22 is a timing chart schematically illustrating an operation timing of the tactile presentation touch panel 400 (see FIG. 21) when the indicator 2 is not in contact with the tactile presentation knob 3.

When the indicator 2 is not in contact with the tactile presentation knob 3, both the conductive elastic portion 6 and the tactile electrode 102 are in a floating state and at the same potential as the detection electrode 203, and the charge detection circuit 212 detects a charge amount mainly from electrostatic capacitance between the detection electrode 203 and the excitation electrode 202.

The touch detection control circuit 213 also outputs the control signal to the tactile presentation voltage generation circuit 113. Based on this control signal, the tactile presentation voltage generation circuit 113 can recognize a touch detection period P1. In the touch detection period P1, the tactile presentation voltage generation circuit 113 disconnects the switch 40 of the switch circuit 112. In this manner, electrical connections between the tactile presentation voltage generation circuit 113 and all the tactile electrodes 102 are disconnected. As a result, the potential of all the tactile electrodes 102 becomes in a floating state.

Next, in a touch coordinate calculation period P2, the touch coordinate calculation circuit 214 determines whether or not there is touch by the indicator 2 on the basis of a charge detection result of mutual capacitance corresponding to each of the excitation electrodes Ty(1) to Ty(m) input from the charge detection circuit 212 and held, in other words, a charge detection result of capacitance of all intersections formed by the excitation electrodes Ty(1) to Ty(m) and the detection electrodes Tx(1) to Tx(n). Electric field coupling between the excitation electrode 202 and the detection electrode 203 is relaxed by proximity or contact of the indicator 2 such as a finger. As a result, charged charges in mutual capacitance are reduced. The touch coordinate calculation circuit 214 can determine the presence or absence of touch based on the degree of the reduction. In a case where touch is determined to be present, the touch coordinate calculation circuit 214 starts calculation of the touch coordinate data on the basis of the charge detection result. Specifically, the touch coordinate calculation circuit 214 can calculate the touch coordinate data by performing arithmetic processing such as gravity center calculation, for example, on a detection result of an intersection where the degree of reduction in charged charges is largest and an intersection around the intersection. When determining that there is no touch, the touch coordinate calculation circuit 214 does not calculate the touch coordinate data, and the processing returns to the touch detection period P1. In order to enable such processing, the touch coordinate calculation circuit 214 gives, to the touch detection control circuit 213, a signal indicating a determination result as to whether or not the indicator 2 is in contact with a touch panel surface and whether or not the indicator 2 is in contact with the tactile presentation knob 3. In a case where a determination result indicating that the indicator 2 is in contact with the tactile presentation knob 3 is not obtained, operation of P1 to P3 is repeated.

Here, description will be made on operation in a case where a determination result indicating presence of contact of the indicator 2 with the tactile presentation knob 3 is obtained.

Figure 24:
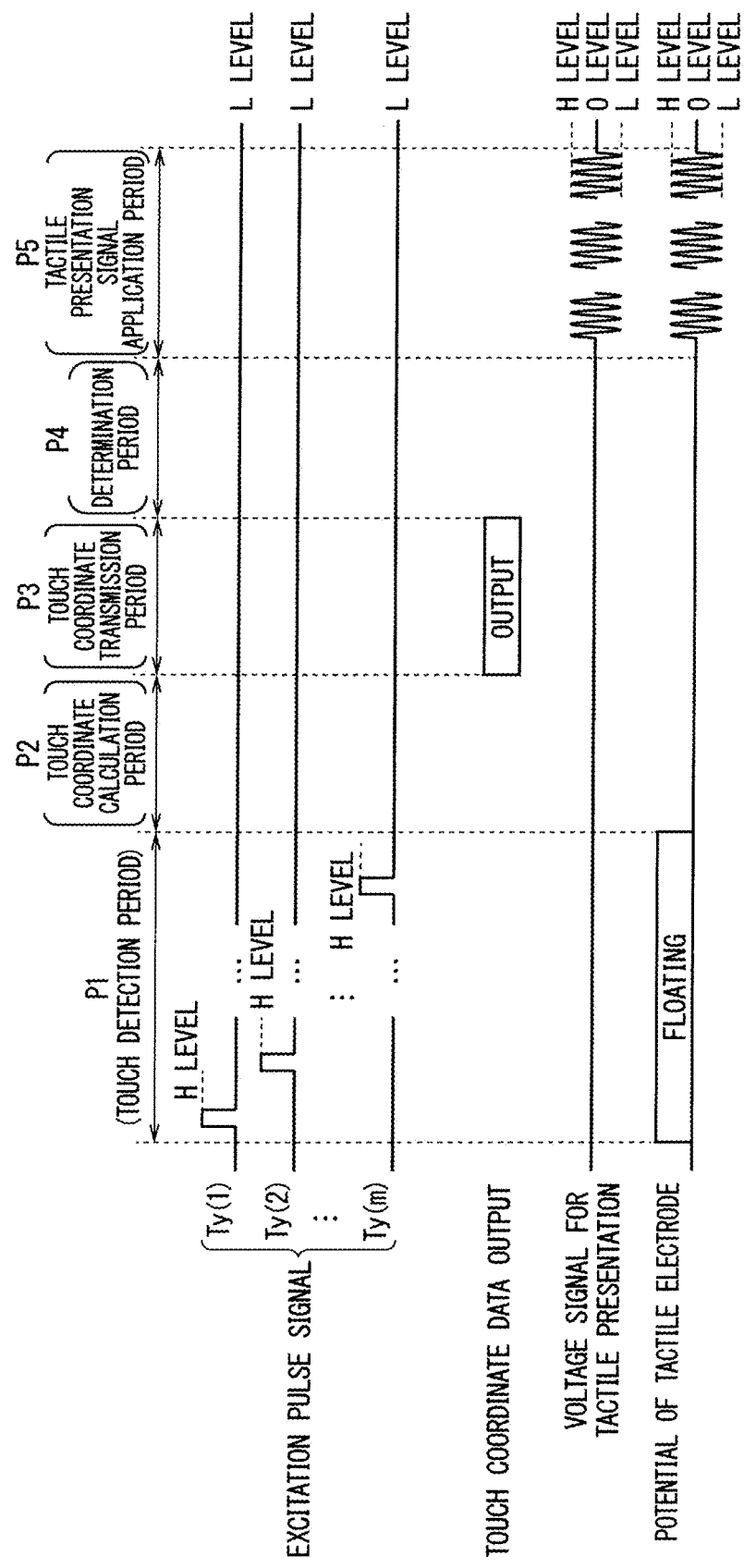
FIG. 24 is a timing chart schematically illustrating an operation timing of the tactile presentation touch panel of FIG. 1 when the indicator is in contact with the tactile presentation knob.

FIG. 23 is a schematic diagram illustrating an image of electrostatic capacitance between the excitation electrode 202 and the position detection unit 7 when the indicator 2 is in contact with the tactile presentation knob 3. FIG. 24 is a timing chart schematically illustrating an operation timing of the tactile presentation touch panel 400 (see FIG. 21) when the indicator 2 is in contact with the tactile presentation knob 3.

In a case where the indicator 2 is in contact with the tactile presentation knob 3, the conductive elastic portion 6 is in a state of being grounded via the tactile presentation knob 3 and the indicator 2, the detection electrode 203 forms electrostatic capacitance with the conductive elastic portion 6 via the tactile electrode 102, and electrostatic capacitance between the detection electrode 203 and the excitation electrode 202 decreases. As a result, a charge amount detected by the charge detection circuit 212 decreases, and it is detected that the indicator 2 comes into contact with the tactile presentation knob 3.

In the touch detection period P1, a control signal indicating a first conversion timing is output from the touch detection control circuit 213 to the excitation pulse generation circuit 215. Upon receiving this control signal, the excitation pulse generation circuit 215 gives an excitation pulse signal (charge pulse signal) to the excitation electrode Ty(1). In this manner, inter-electrode capacitance (mutual capacitance) between the excitation electrode Ty(1) and each of the detection electrodes Tx(1) to Tx(n) intersecting with the excitation electrode Ty(1) in plan view is charged. The charge detection circuit 212 detects a charge amount by the charging using the detection electrodes Tx(1) to Tx(n). Then, the charge detection circuit 212 performs analog/digital conversion (A/D conversion) on the detection result, and outputs digital information obtained by the analog/digital conversion to the touch coordinate calculation circuit 214 as a charge detection result of mutual capacitance corresponding to the excitation electrode Ty(1). Similarly, control signals indicating second to m-th conversion timings are sequentially output from the touch detection control circuit 213 to the excitation pulse generation circuit 215. In a manner corresponding to each of the second to m-th conversion timings, charge detection results of mutual capacitances corresponding to the excitation electrodes Ty(2) to Ty(m) are output to the touch coordinate calculation circuit 214.

The touch detection control circuit 213 also outputs the control signal to the tactile presentation voltage generation circuit 113. Based on this control signal, the tactile presentation voltage generation circuit 113 can recognize a touch detection period P1. In the touch detection period P1, the tactile presentation voltage generation circuit 113 disconnects the switch 40 of the switch circuit 112. In this manner, electrical connections between the tactile presentation voltage generation circuit 113 and all the tactile electrodes 102 are disconnected. As a result, the potential of all the tactile electrodes 102 becomes in a floating state.

Next, in a touch coordinate calculation period P2, the touch coordinate calculation circuit 214 determines whether or not there is touch by the indicator 2 on the basis of a charge detection result of mutual capacitance corresponding to each of the excitation electrodes Ty(1) to Ty(m) input from the charge detection circuit 212 and held, in other words, a charge detection result of capacitance of all intersections formed by the excitation electrodes Ty(1) to Ty(m) and the detection electrodes Tx(1) to Tx(n). Electric field coupling between the excitation electrode 202 and the detection electrode 203 is relaxed by proximity or contact of the indicator 2 such as a finger. As a result, charged charges in mutual capacitance are reduced. The touch coordinate calculation circuit 214 can determine the presence or absence of touch based on the degree of the reduction. In a case where touch is determined to be present, the touch coordinate calculation circuit 214 starts calculation of the touch coordinate data on the basis of the charge detection result. Specifically, the touch coordinate calculation circuit 214 can calculate the touch coordinate data by performing arithmetic processing such as gravity center calculation, for example, on a detection result of an intersection where the degree of reduction in charged charges is largest and an intersection around the intersection. When determining that there is no touch, the touch coordinate calculation circuit 214 does not calculate the touch coordinate data, and the processing returns to the touch detection period P1. In order to enable such processing, the touch coordinate calculation circuit 214 gives, to the touch detection control circuit 213, a signal indicating a determination result as to the presence or absence of touch.

Next, in a touch coordinate transmission period P3, according to a touch coordinate data transmission timing from the touch detection control circuit 213, the touch coordinate calculation circuit 214 outputs the touch coordinate data to each of the outside of the tactile presentation touch panel 400 and the voltage supply circuit 110 of the tactile presentation panel 100.

Next, in a determination period P4, the tactile presentation control circuit 114 determines the position of the tactile presentation knob 3 from the touch coordinate data, and determines an area where a tactile sense is presented.

The tactile presentation control circuit 114 selects a tactile presentation signal waveform corresponding to coordinates of a display screen and the tactile presentation knob 3. The "tactile presentation signal waveform" defines a waveform of the voltage signal $V_a$ and the voltage signal $V_b$. Note that a difference in waveform between the voltage signal $V_a$ and the voltage signal $V_b$ is typically a difference in frequency. The tactile presentation signal waveform is set inside or outside the tactile presentation control circuit 114. The number of types of the tactile presentation signal waveforms may be one or more than one. In a case where there is only one type of the tactile presentation signal waveform, processing of selecting the tactile presentation signal waveform is not necessary. In a case where there is more than one type of the tactile presentation signal waveform, typically, a plurality of tactile presentation coordinate regions or display screen modes corresponding to the types are set in advance, and a type of the tactile presentation signal waveform is selected according to which region touch coordinates are included.

Next, in a tactile presentation signal application period P5, the tactile presentation control circuit 114 generates a tactile presentation signal with the tactile presentation signal waveform. Further, the switch 40 connected to the tactile electrode 102 in a region where the tactile presentation signal is input of the switch circuit 112 is connected to the tactile presentation voltage generation circuit 113, and the switch 40 connected to the tactile electrode 102 in a region where the tactile presentation signal is not input is connected to GND, or the tactile electrode 102 is left floating without turning on the switch. In this manner, a signal is applied to the tactile electrode 102, and a tactile sense is presented. In the example of FIG. 24, an AC signal having an H level (high level) and an L level (low level) is applied to the tactile electrode 102. The tactile electrode 102 is charged at a high voltage of the positive electrode, typically plus tens of volts, in a period of the H level, discharged in a period of a zero level, and charged at a high voltage of the negative electrode, typically minus tens of volts, at the L level. A generation cycle and a generation period of a pulse signal can be appropriately set according to a tactile sense to be imparted.

After the tactile presentation signal application period P5, the processing returns to the touch detection period P1. By the above, the above-described operation is repeated. In this manner, the tactile presentation touch panel 400 can perform the position detection of the tactile presentation knob 3 and the tactile presentation according to the position of the tactile presentation knob 3 and a display screen.

Figure 25:
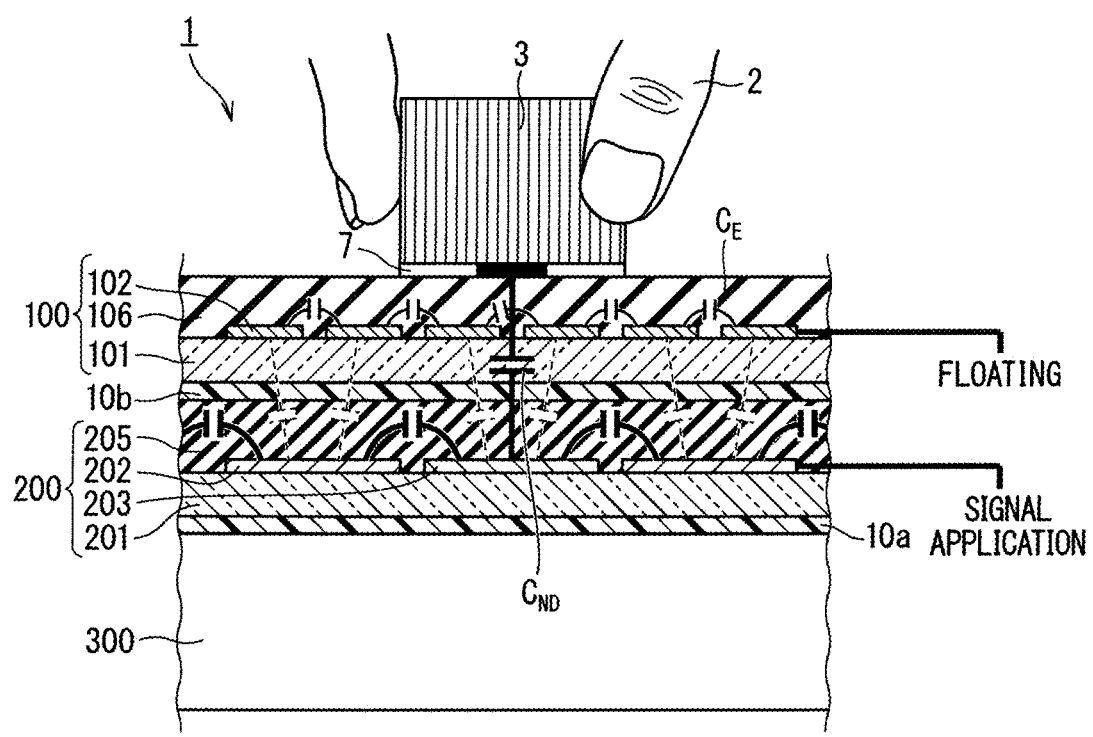
FIG. 25 is a schematic diagram for explaining electrostatic capacitance formed in the tactile presentation touch panel in FIG. 1 when the tactile presentation touch panel detects a touch position.

FIG. 25 is a schematic diagram illustrating formation of electrostatic capacitance in the tactile presentation touch panel 400 in the touch detection period P1 (see FIG. 24). In the touch detection period P1, electrostatic capacitance $C_{ND}$ is formed between the indicator 2 and the detection electrode 203. During this period, the potential of all the tactile electrodes 102 is in a floating state. This prevents the tactile electrode 102 from functioning as a shield. Therefore, the sensitivity of touch detection can be enhanced.

Figure 26:
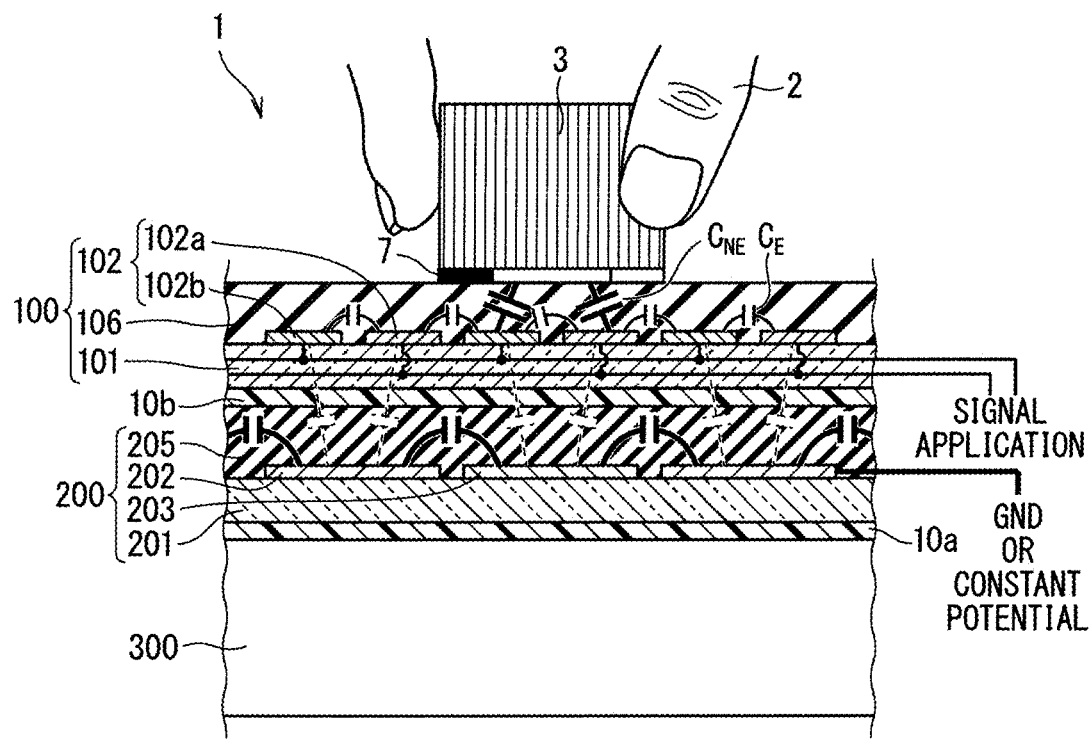
FIG. 26 is a schematic diagram for explaining electrostatic capacitance formed in the tactile presentation touch panel in FIG. 1 when the tactile presentation touch panel generates a tactile sense.

FIG. 26 is a schematic diagram illustrating formation of electrostatic capacitance in the tactile presentation touch display 1 in the tactile presentation signal application period P5 (see FIG. 24). In the tactile presentation signal application period P5, potential of the excitation electrode 202 and the detection electrode 203 of the touch panel 200 may be in a floating state. In this manner, it is possible to suppress the influence of the capacitance formation by the excitation electrode 202 and the detection electrode 203 on the electrostatic capacitance $C_{NE}$. Alternatively, the potential of the excitation electrode 202 and the detection electrode 203 of the touch panel 200 may be substantially constant potential, and for example, the excitation electrode 202 and the detection electrode 203 may be connected to ground potential with low impedance. In this manner, the excitation electrode 202 and the detection electrode 203 can function as a shield between the tactile electrode 102 and the display panel 300. Therefore, generation of noise in the display panel 300 due to a high voltage signal applied to the tactile electrode 102 is suppressed. Therefore, display defects due to noise can be prevented. Conversely, generation of noise in the tactile electrode 102 due to the display panel 300 is suppressed. When a tactile presentation signal is applied to the tactile electrode, the conductive elastic portion 6 forms electrostatic capacitance with the tactile electrode 102, and electric charges having potential opposite to voltage of the tactile electrode 102 are accumulated on a surface in contact with the dielectric layer 106 of the conductive elastic portion 6, and an electrostatic force is generated between the conductive elastic portion 6 and the dielectric layer 106. As a result, a frictional force between the conductive elastic portion 6 and the dielectric layer 106 changes, and minute vibration occurs when the tactile presentation knob 3 is rotated, and the vibration is transmitted to the indicator 2 and felt as an operational feeling when the tactile presentation knob 3 is rotated.

Note that, in a case where a floating state is used, both the excitation electrode 202 and the detection electrode 203 may be in the floating state, or one of them may be in the floating state. Further, in a case where constant potential is used, both the excitation electrode 202 and the detection electrode 203 may be set to the constant potential, or one of them may be set to the constant potential. The configuration may be such that one of the excitation electrode 202 and the detection electrode 203 is set to be in a floating state, and the other is set at the constant potential. When distances between the excitation electrode 202 and the detection electrode 203 and the tactile electrode 102 are different, one of the excitation electrode 202 and the detection electrode 203 that is closer to the tactile electrode 102 may be in the floating state, and the other that is farther may be in the constant potential.

Note that, in the example illustrated in FIG. 20, the touch coordinate data is sent from the touch detection circuit 210 to the voltage supply circuit 110. However, as a variation, information on a charge detection result may be sent from the charge detection circuit 212 to the voltage supply circuit 110. In this case, the tactile presentation control circuit 114 performs determination of the presence or absence of touch and calculation of touch coordinates by using the information on a charge detection result.

<Suppression of Charge Accumulation in Conductive Elastic Portion>

Figure 27:
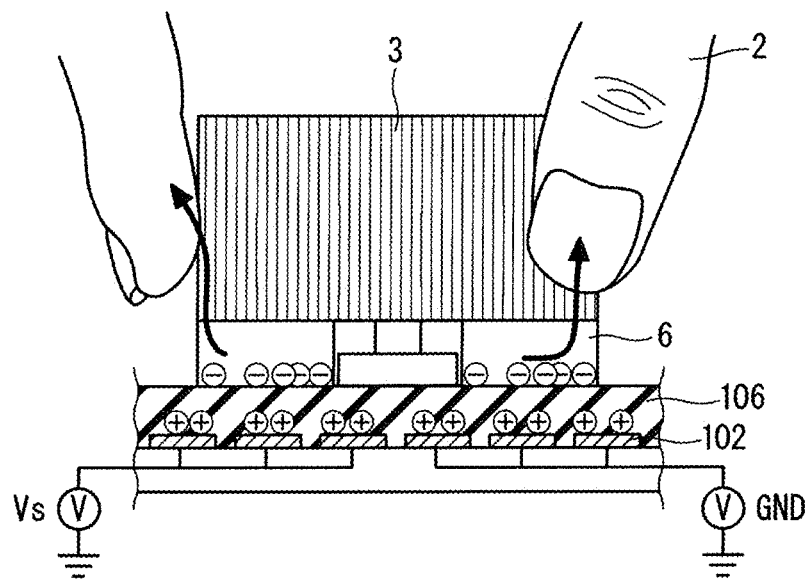
FIG. 27 is an image diagram schematically illustrating movement of electric charges accumulated in the conductive elastic portion when the tactile presentation knob is connected to the ground via the indicator at the time of signal voltage application according to the first embodiment of the present invention.
Figure 28:
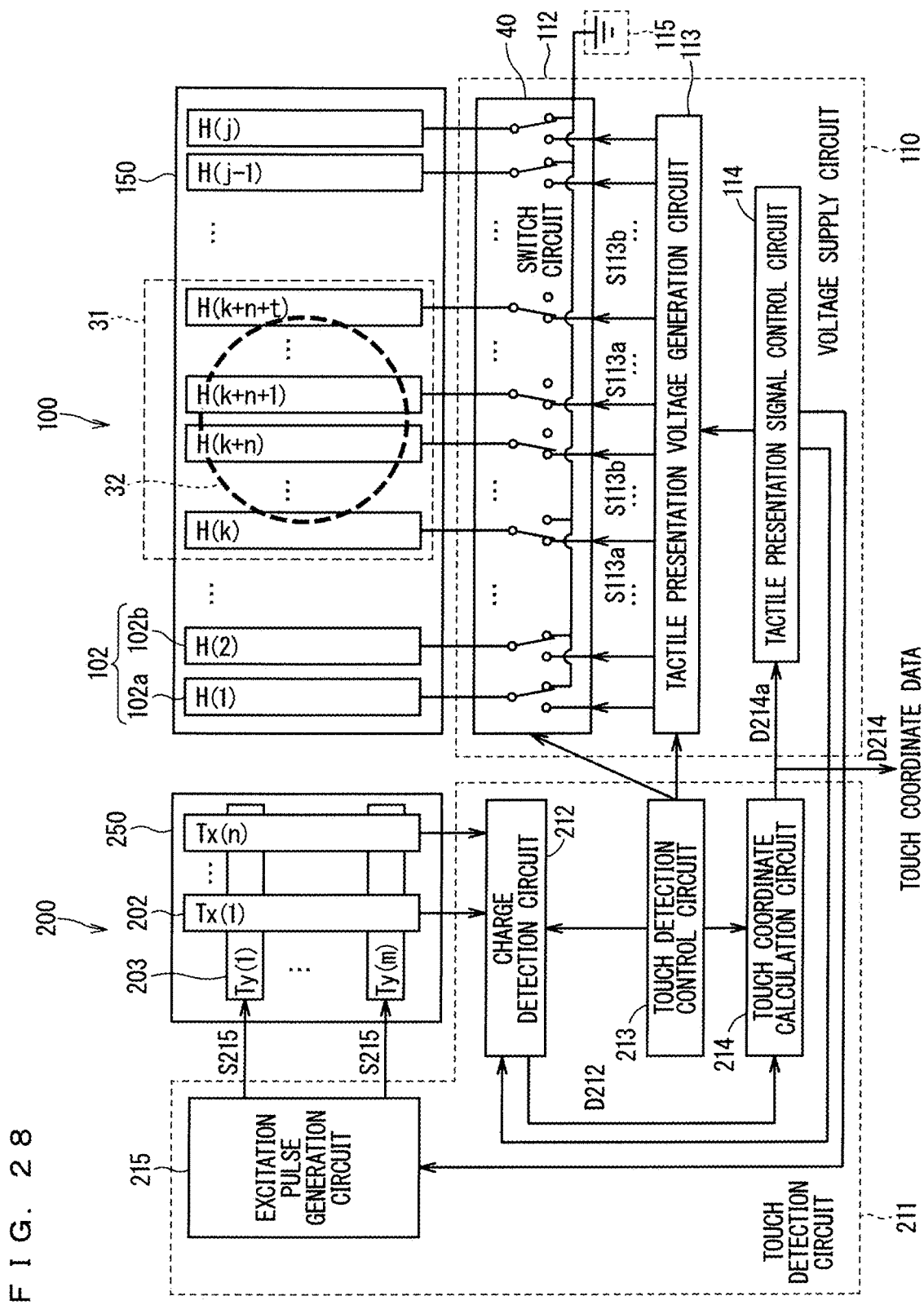
FIG. 28 is a block diagram schematically illustrating a configuration of the tactile presentation touch panel when a part of tactile electrodes with which the tactile presentation knob is in contact via a dielectric layer is connected to the ground at the time of signal voltage application according to the first embodiment of the present invention.

FIG. 27 is an image diagram schematically illustrating movement of electric charges accumulated in the conductive elastic portion 6 when the charges are grounded via the indicator 2 at the time of signal voltage application. FIG. 28 is an image diagram schematically illustrating movement of electric charges accumulated in the conductive elastic portion 6 when a part of the tactile electrodes 102 with which the tactile presentation knob 3 is in contact via the dielectric layer 106 is connected to the ground at the time of signal voltage application. The conductive elastic portion 6, which is formed by mixing conductive carbon black or metal particles with insulating resin, has relatively high resistance and easily accumulates electric charges. When electric charges are accumulated in the conductive elastic portion 6, an electrostatic force between the conductive elastic portion 6 and the tactile electrode 102 does not change due to signal voltage, and the tactile strength decreases. When the conductive elastic portion 6 and a surface of the rotation portion 4 are electrically connected to each other, the indicator 2 is connected to the ground via the indicator 2 when the indicator 2 comes into contact with the rotation portion 4. In this manner, electric charges accumulated in the conductive elastic portion 6 are released, and accumulation of electric charges can be suppressed.

<Suppression of Charge Accumulation in Conductive Elastic Portion>

FIG. 27 is an image diagram schematically illustrating movement of electric charges accumulated in the conductive elastic portion 6 when the charges are grounded via the indicator 2 at the time of signal voltage application. The conductive elastic portion 6, which is formed by mixing conductive carbon black or metal particles with insulating resin, has relatively high resistance and easily accumulates electric charges. When electric charges are accumulated in the conductive elastic portion 6, an electrostatic force between the conductive elastic portion 6 and the tactile electrode 102 does not change due to signal voltage, and the tactile strength decreases. When the conductive elastic portion 6 and a surface of the rotation portion 4 are electrically connected to each other, the indicator 2 is connected to the ground via the indicator 2 when the indicator 2 comes into contact with the rotation portion 4. In this manner, electric charges accumulated in the conductive elastic portion 6 are released, and accumulation of electric charges can be suppressed.

In a case where resistance of the conductive elastic portion 6 is high, charges hardly move in the conductive elastic portion 6, and charges cannot be sufficiently released only by releasing the charges via the indicator 2 as described above. In that case, the tactile electrode 102 is driven so that at least one of the conductive elastic portions 6 divided into two or more when a signal voltage is applied forms electrostatic capacitance with the tactile electrode 102, and at least one is connected via the dielectric layer 106 to the tactile electrode 102 connected to a charge discharge portion 115 (see FIG. 28 to be described later) which is connected to the ground. In this manner, accumulation of electric charges is prevented. The tactile electrode 102 connected to the charge discharge portion 115 does not need to be fixed, and application of signal voltage and connection to the charge discharge portion 115 may be switched and driven in the same tactile electrode 102, or the tactile electrode 102 to which signal voltage is applied and the tactile electrode 102 connected to the charge discharge portion 115 may be alternately arranged. However, no electrostatic force is generated in the tactile electrode 102 connected to the charge discharge portion 115. Therefore, in order to prevent a decrease in a tactile sense, the number of the tactile electrodes 102 to which signal voltage is applied is made larger than the number of the tactile electrodes 102 connected to the charge discharge portion 115, or time for connecting to the charge discharge portion 115 is made shorter than time for applying signal voltage. In this manner, an effective area of the conductive elastic portion 6 that generates an electrostatic force with the tactile electrode 102 is preferably made larger than an effective area of the conductive elastic portion 6 that forms capacitance with the charge discharge portion 115.

FIG. 28 is a block diagram illustrating a configuration in a case where the tactile electrode 102 is driven such that at least one of the conductive elastic portions 6 divided into two or more forms electrostatic capacitance with the tactile electrode 102, and at least one is connected to the tactile electrode 102 connected to the ground via the dielectric layer 106. In the determination period P4, the tactile presentation control circuit 114 determines the position where the tactile presentation knob 3 is placed from the touch coordinate data, determines an area where a tactile sense is presented, divides the area into two or more areas, and determines an area where a tactile presentation signal is input and an area connected to GND.

The tactile presentation control circuit 114 selects a tactile presentation signal waveform corresponding to coordinates of a display screen and the tactile presentation knob 3. The "tactile presentation signal waveform" defines a waveform of the voltage signal $V_a$ and the voltage signal $V_b$. Note that a difference in waveform between the voltage signal $V_a$ and the voltage signal $V_b$ is typically a difference in frequency. The tactile presentation signal waveform is set inside or outside the tactile presentation control circuit 114. The number of types of the tactile presentation signal waveforms may be one or more than one. In a case where there is only one type of the tactile presentation signal waveform, processing of selecting the tactile presentation signal waveform is not necessary. In a case where there is more than one type of the tactile presentation signal waveform, typically, a plurality of tactile presentation coordinate regions or display screen modes corresponding to the types are set in advance, and a type of the tactile presentation signal waveform is selected according to which region touch coordinates are included.

Next, in a tactile presentation signal application period P5, the tactile presentation control circuit 114 generates a tactile presentation signal with the tactile presentation signal waveform. Further, the switch 40 connected to the tactile electrode 102 in a region where the tactile presentation signal is input of the switch circuit 112 is connected to the tactile presentation voltage generation circuit 113, and the switch 40 connected to the tactile electrode 102 in a region connected to GND is connected to GND. The switch 40, which is connected to the tactile electrode 102 in a region where no tactile presentation signal is input, is connected to GND, or the tactile electrode 102 is kept floating without the switch 40 is switched on. In this manner, a signal is applied to the tactile electrode 102, and a tactile sense is presented. In the example of FIG. 24, an AC signal having an H level (high level) and an L level (low level) is applied to the tactile electrode 102. The tactile electrode 102 is charged at a high voltage of the positive electrode, typically plus tens of volts, in a period of the H level, discharged in a period of a zero level, and charged at a high voltage of the negative electrode, typically minus tens of volts, at the L level. A generation cycle and a generation period of a pulse signal can be appropriately set according to a tactile sense to be imparted.

After the tactile presentation signal application period P5, the processing returns to the touch detection period P1. By the above, the above-described operation is repeated. In this manner, the tactile presentation touch panel 400 can perform the position detection of the tactile presentation knob 3 and the tactile presentation according to the position of the tactile presentation knob 3 and a display screen.

Note that, in the first embodiment, a GND terminal is used as the charge discharge portion 115. However, other configurations may be used as long as electric charges accumulated in the conductive elastic portion 6 can be discharged. For example, positive voltage or negative voltage for efficiently discharging charges may be applied instead of a GND terminal according to the conduction degree of electric charges accumulated in the conductive elastic portion 6.

<Difference between Electrode Structure of Tactile Presentation Screen and Electrode Structure of Touch Screen>

As a preferable condition of the tactile electrode 102, firstly, a configuration in which the indicator 2 can be in contact with the tactile electrode 102 without a member other than the dielectric layer 106 interposed between them is desired. Therefore, the tactile electrode 102 covered with the dielectric layer 106 is preferably arranged on an outermost surface of the tactile presentation touch panel 400.

Secondly, the shorter a distance between the indicator 2 and the tactile electrode 102, the larger a tactile sense can be generated. From this viewpoint, the thickness of the dielectric layer 106 is preferably small, and the dielectric constant of the dielectric layer 106 is preferably large.

Thirdly, it is desirable that the tactile electrodes 102 densely exist in order to make the electrostatic capacitance $C_{NE}$ (see FIG. 26) large at the time of generation of a tactile sense, while it is preferable that capacitance $C_E$ between the tactile electrodes 102, that is, inter-electrode capacitance be small at the time of detection of a touch position (see FIG. 25) so that the formation of the capacitance $C_{ND}$ is not hindered.

In a case where the tactile presentation touch panel 400 is larger in size than the tactile presentation knob 3, and an area where the tactile presentation knob 3 is not placed is used as a touch panel that does not present a tactile sense, when the indicator 2 is not in contact with the tactile presentation knob 3, an operation timing (FIG. 22) when the indicator 2 is not in contact with the tactile presentation knob 3 is repeated for an entire surface of the tactile presentation touch panel 400. When touch is detected in an area used as a touch panel that does not perform tactile presentation, a touch position is calculated and output. When the indicator 2 comes into contact with the tactile presentation knob 3, touch detection is stopped in an area where the tactile presentation knob 3 is not placed, and operation is performed at an operation timing when the indicator 2 comes into contact with the tactile presentation knob 3 as described above (FIG. 24) only in an area where the tactile presentation knob 3 is placed.

In a case where an area where the tactile presentation knob 3 is not placed is used as a touch panel that presents a tactile sense, when the indicator 2 is not in contact with the tactile presentation knob 3, an operation timing (FIG. 22) when the indicator 2 is not in contact with the tactile presentation knob 3 is repeated for an entire surface of the tactile presentation touch panel 400. When touch detection is performed on an area used as a touch panel that performs tactile presentation, operation is performed at an operation timing when the indicator 2 is in contact with the tactile presentation knob 3 as described above (FIG. 24). When the indicator 2 comes into contact with the tactile presentation knob 3, touch detection is stopped in an area where the tactile presentation knob 3 is not placed, and operation is performed at an operation timing when the indicator 2 comes into contact with the tactile presentation knob 3 as described above (FIG. 24) only in an area where the tactile presentation knob 3 is placed.

As a preferable condition of the excitation electrode 202 and the detection electrode 203, firstly, in order to ensure sensitivity and linearity of touch position detection, a matrix structure by which a touch position can be identified accurately is required. Secondly, since the indicator 2 and the detection electrode 203 detect the touch position by the electrostatic capacitance $C_{ND}$ formed through the tactile presentation screen 150, it is necessary to provide a predetermined distance (several hundred μm or more and several mm or less) between the excitation electrode 202 and the detection electrode 203 so that an electric field spreads in the lateral direction.

As described above, there is a difference between a preferable condition of the tactile electrode 102 and a preferable condition of the excitation electrode 202 and the detection electrode 203. In order to optimize both conditions, it is not desirable to apply similar structures to them.

<Details of Lead-Out Wiring Layer>

The lead-out wiring layers 105 (FIG. 12) of the tactile presentation screen 150 specifically include lead-out wiring layers Ld(1) to Ld(j) and lead-out wiring layers Lu(1) to Lu(j). Assuming that an integer of any of numbers 1 to j is k, each of the lead-out wiring layers Ld(k) and Lu(k) is connected to the k-th tactile electrode 102. Each of the lead-out wiring layers Ld(k) and Lu(k) is connected to a first end and a second end in an extending direction of one of the tactile electrode 102.

Wiring resistance of each of the tactile electrodes 102 provided on the tactile presentation screen 150 is desirably high resistance from the viewpoint of not hindering touch detection by the touch screen 250, and is desirably, for example, 104Ω or more. In a case where wiring resistance is high as described above, propagation delay of a voltage signal in a wiring layer is likely to occur. As described above, the lead-out wiring layer 105 is connected to each of the first end and the second end of the tactile electrode 102, so that propagation delay can be suppressed.

The lead-out wiring layers Ld(1) to Ld(j) are arranged outside the tactile presentable area, and extend to corresponding electrodes in order from one closer to the center of an array of the tactile presentation panel terminal portions 107 so that a substantially shortest distance from the tactile presentation panel terminal portions 107 can be obtained. The tactile presentation panel terminal portion 107 is arranged in the vicinity of the center of a long side of the transparent insulating substrate 101 along the long side. The lead-out wiring layers Ld(1) to Ld(j) are arranged as densely as possible while securing mutual insulation. The lead-out wiring layers Lu(1) to Lu(j) are similarly arranged outside a region occupied by the lead-out wiring layers Ld(1) to Ld(j). With such arrangement, it is possible to suppress an area of a portion outside the tactile presentable area of the transparent insulating substrate 101.

The lead-out wiring layers 105, specifically, the lead-out wiring layers Ld(1) to Ld(j) and the lead-out wiring layers Lu(1) to Lu(j) are preferably composed of either a metal single-layer film or a laminated film of a metal single-layer and a non-metal single-layer. In a case where the laminated film has a lower layer and an upper layer covering the lower layer, the upper layer may have a function as a protective layer of the lower layer. For example, the upper layer as a protective layer may protect the lower layer from an etchant in an etching process used to manufacture the tactile presentation screen 150. Alternatively, the upper layer may function as a cap layer that prevents corrosion of the lower layer during manufacture or use of the tactile presentation screen 150. When a material of the lower layer is a material having more excellent adhesion to the transparent insulating substrate 101 than a material of the upper layer, the occurrence of peeling of the lead-out wiring layer 105 can be suppressed.

<Effect>

According to the first embodiment, when the user performs operation by using the tactile presentation knob 3 on the tactile presentation touch panel 400, a tactile sense of an operational feeling and an operation amount of the tactile presentation knob 3 is presented to the user, and an operational feeling as that obtained when a mechanical dial knob is operated is obtained, so that the operational accuracy based on a tactile sense can be improved and the reliability of operation can be obtained. Further, since the position of a dial knob on a touch panel and a tactile sense at the time of operation can be optionally set, by using one dial knob for a plurality of operation purposes, the number of operation switches can be reduced, and an HMI layout in consideration of user's operation convenience and usage is possible. Further, when one dial knob is used for a plurality of operation purposes, an effect of preventing erroneous operation can be obtained by utilizing a tactile sense at the time of operation for identification of operation content. Further, in a setting region outside a standard setting range at the time of condition setting or the like, it is possible to obtain an effect of preventing dangerous operation in such a manner as imparting the user a tactile sense that allows the user to sense danger.

In a case where the user operates the tactile presentation knob 3 on the tactile presentation touch display 1, the user can detect a place where the tactile presentation knob 3 is placed and a scale can be displayed in accordance with a position and a setting state of the tactile presentation knob 3, and knob operation can be performed at an optional position where the user can perform operation in the display area.

Further, the tactile electrode 102 is driven so that at least one of the conductive elastic portions 6 divided into two or more forms electrostatic capacitance with the tactile electrode 102, and at least one is connected via the dielectric layer 106 to the tactile electrode 102 connected to the ground. In this manner, electric charges accumulated in the conductive elastic portion 6 having comparatively high resistance are directly released to the tactile electrode 102 via the dielectric layer 106, so that accumulation of electric charges can be prevented. Therefore, it is possible to prevent generation of an unintended tactile sense due to a tactile sense caused by accumulation of electric charges in the conductive elastic portion 6 and deterioration of the conductive elastic portion 6.

The present invention is also applicable to a case where the tactile presentation knob 3 is used in a stationary state. In this case, it is not necessary to detect the position of the tactile presentation knob 3, and it is also possible to detect that the indicator 2 comes into contact with the tactile presentation knob 3 by the excitation electrode 202 and the detection electrode 203, and then present a tactile sense to the tactile presentation knob 3 without detecting the touch position. That is, functions of the touch panel 200 in FIG. 1 do not need to include a function of detecting both touch and touch coordinates, and the effect of the first embodiment can be achieved as long as at least only detection of touch is included. Further, the tactile presentation knob 3 can detect touch by using the conductive elastic portion 6 even if the position detection unit 7 is not included. Further, in the above case, the tactile presentation panel 100 and the touch panel 200 are not necessarily provided on the entire tactile presentation touch display 1, and only need to be provided only in a region where the tactile presentation knob 3 is arranged.

Further, in a case where the tactile presentation knob 3 is used in a stationary state and a region in which the tactile presentation knob 3 as described above is arranged is provided at a plurality of specific locations on the touch panel 200 and one of the tactile presentation knob 3 is arranged at a preferred location among a plurality of the specific locations, it is necessary to detect a location where the tactile presentation knob 3 is arranged when the touch is detected.

Second Embodiment

Figure 29:
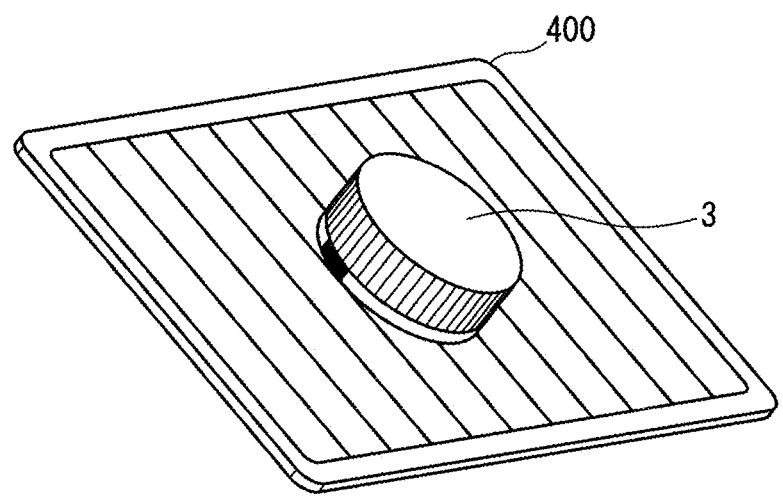
FIG. 29 is an image diagram in a case where the tactile presentation knob according to a second embodiment of the present invention is used on the tactile presentation touch panel erected obliquely or vertically.
Figure 30:
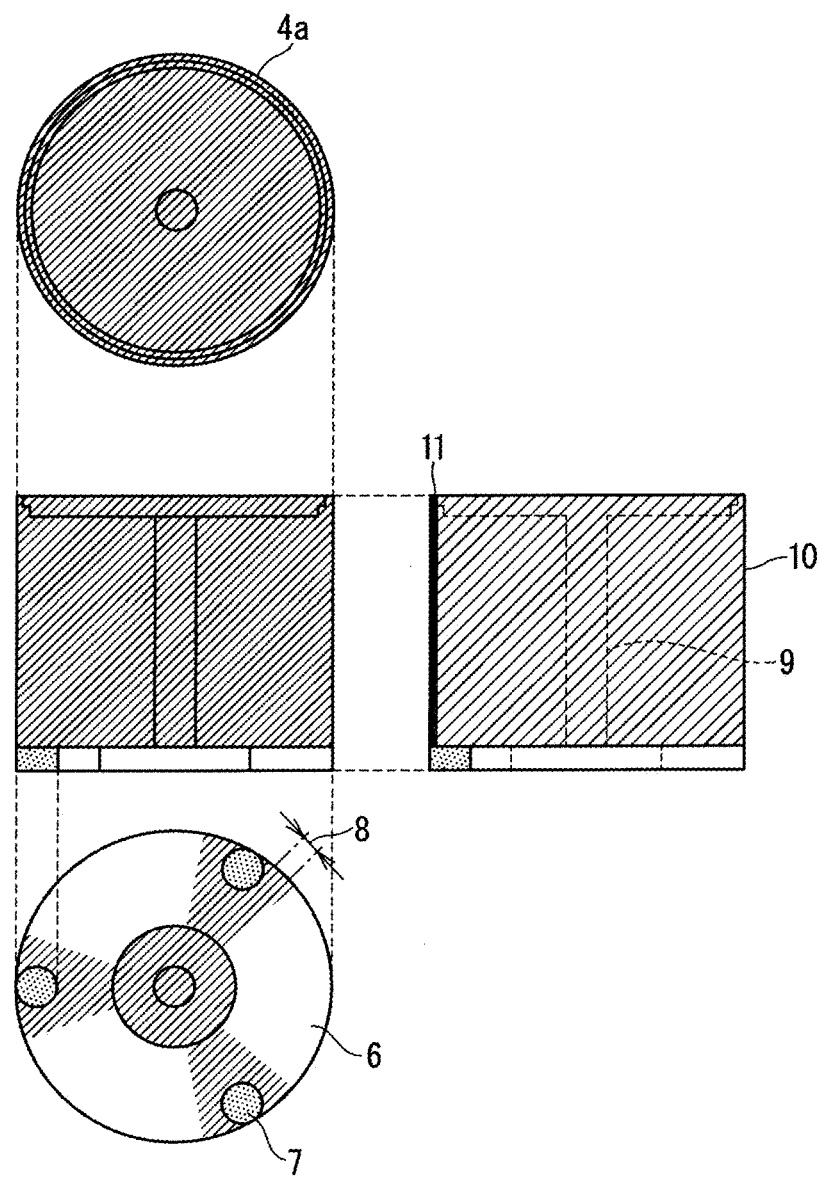
FIG. 30 is a schematic view illustrating a structure of the rotation portion in a case where the tactile presentation knob according to the second embodiment of the present invention is used on the tactile presentation touch panel erected obliquely or vertically.
Figure 31:
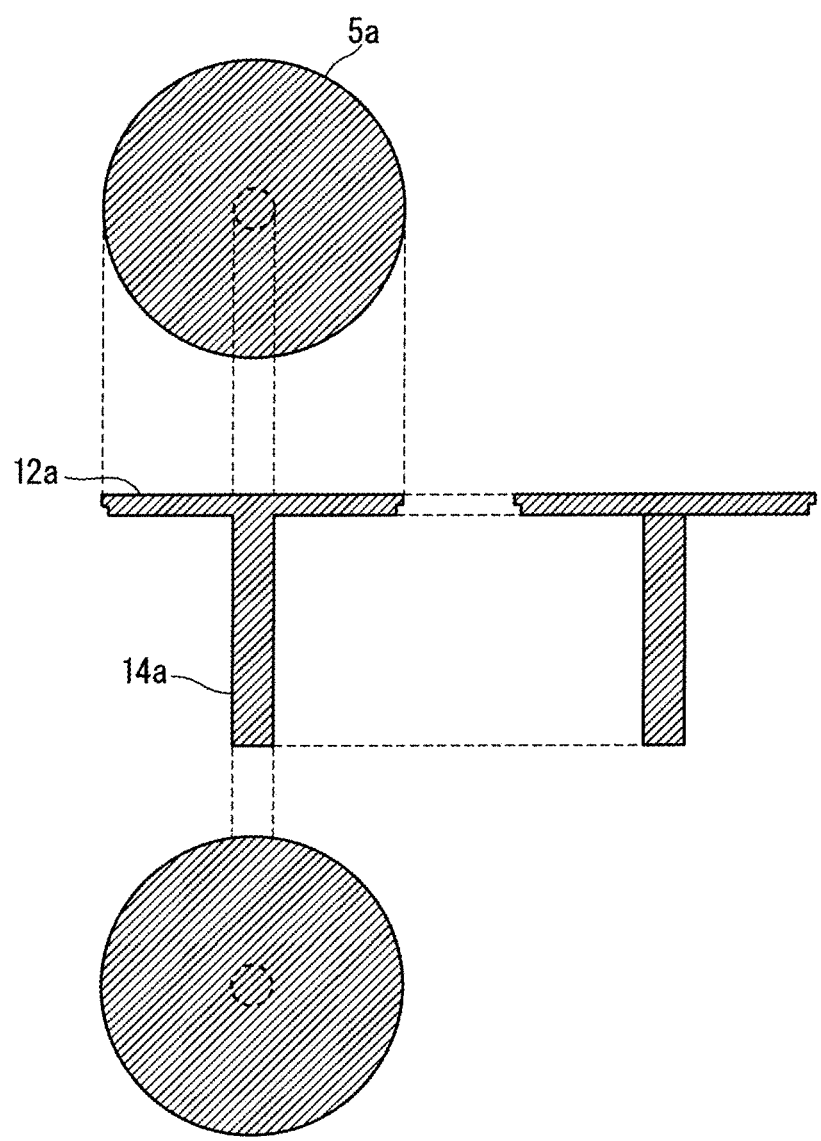
FIG. 31 is a schematic view of the fixing portion in a case where the tactile presentation knob according to the second embodiment of the present invention is used on the tactile presentation touch panel erected obliquely or vertically.
Figure 32:
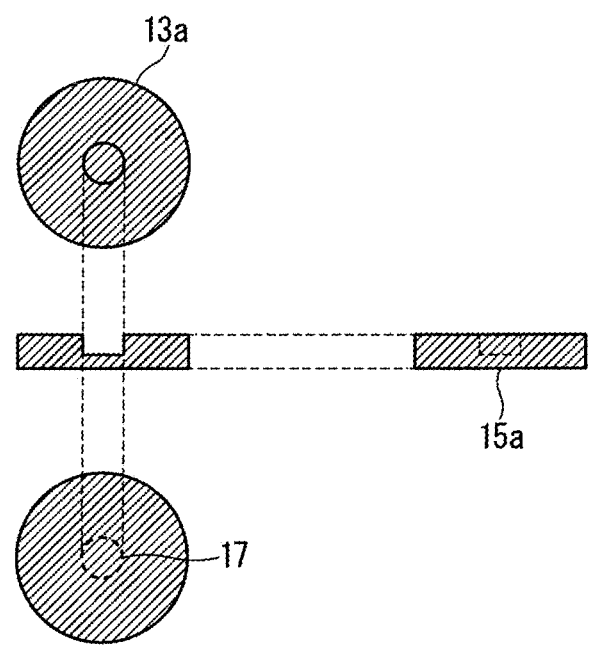
FIG. 32 is a schematic view of a fixing table in a case where the tactile presentation knob according to the second embodiment of the present invention is used on the tactile presentation touch panel erected obliquely or vertically.

FIG. 29 is an image diagram in a case where the tactile presentation knob 3 is used on the tactile presentation touch panel 400 erected obliquely or vertically. FIG. 30 is a schematic view illustrating a structure of a rotation portion 4a in a case where the tactile presentation knob 3 is used on the tactile presentation touch panel 400 erected obliquely or vertically. FIG. 31 is a schematic view illustrating a structure of a fixing portion 5a in a case where the tactile presentation knob 3 is used on the tactile presentation touch panel 400 erected obliquely or vertically. FIG. 32 is a schematic view illustrating a structure of a fixing table 13a in a case where the tactile presentation knob 3 is used on the tactile presentation touch panel 400 erected obliquely or vertically.

In a case where the tactile presentation knob 3 is used on the tactile presentation touch panel 400 erected obliquely or vertically instead of horizontally, it is necessary to have a structure in which the rotation portion 4a does not come off the fixing portion 5a while holding a mechanism of rotating about a shaft portion 14a. An example of such a structure of the tactile presentation knob 3 will be described. For example, the shaft portion 14a of the fixing portion 5a and the fixing table 13a is preferably connected and bonded and fixed such that the rotation portion 4a is sandwiched between the fixing portion 5a and the fixing table 13a so that the rotation portion 4a does not come off the fixing portion 5a, and the fixing table 13a is preferably bonded to the tactile presentation touch panel 400 and used. Alternatively, a tip of the shaft portion 14a may be externally threaded and the adhesive portion 17 may be internally threaded to be connected, and the fixing table 13a may be bonded to the tactile presentation touch panel 400 and used.

<Effect>

With the structure in which the rotation portion 4a and the fixing portion 5a are connected while a mechanism in which the rotation portion 4a rotates about the shaft portion 14a is held, the tactile presentation knob 3 can be used regardless of an angle at which the tactile presentation touch panel 400 is fixed.

Third Embodiment

Figure 33:
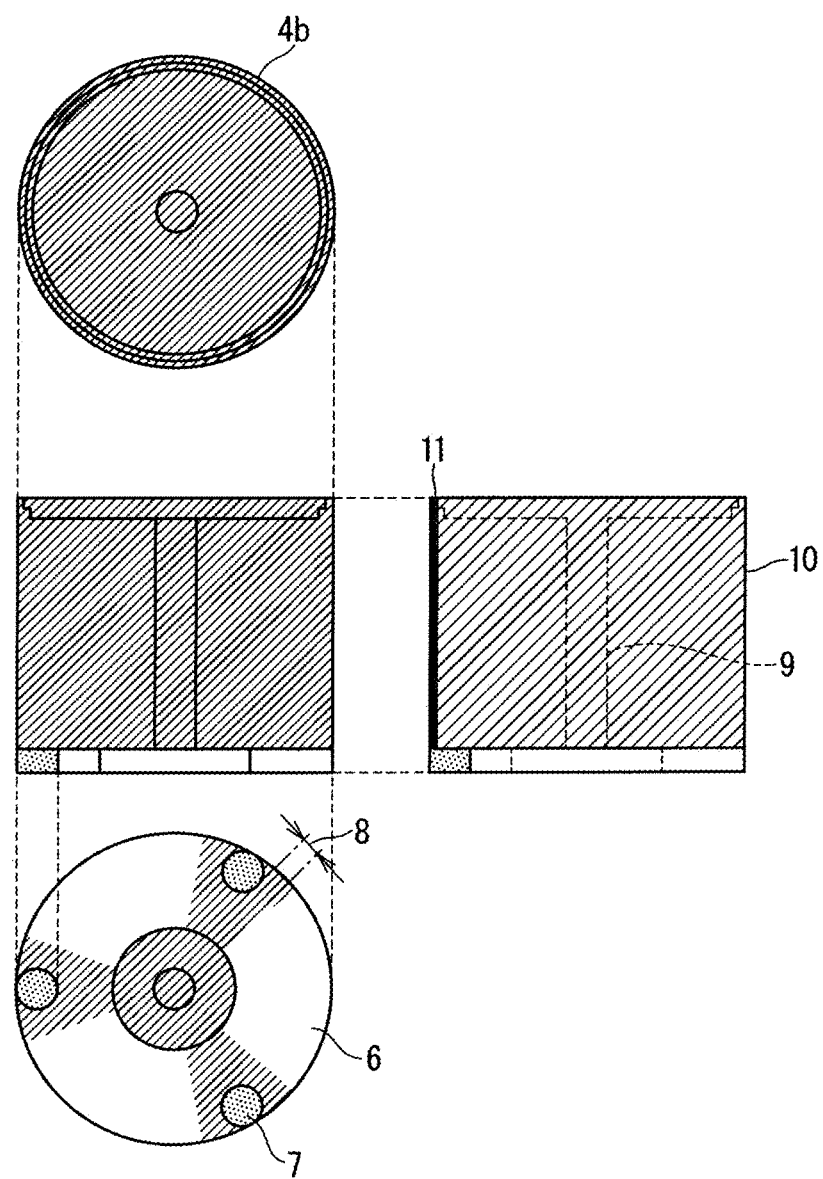
FIG. 33 is a schematic diagram of the rotation portion in a case where the tactile presentation knob according to a third embodiment of the present invention is operated by changing a position where the tactile presentation knob is placed.
Figure 34:
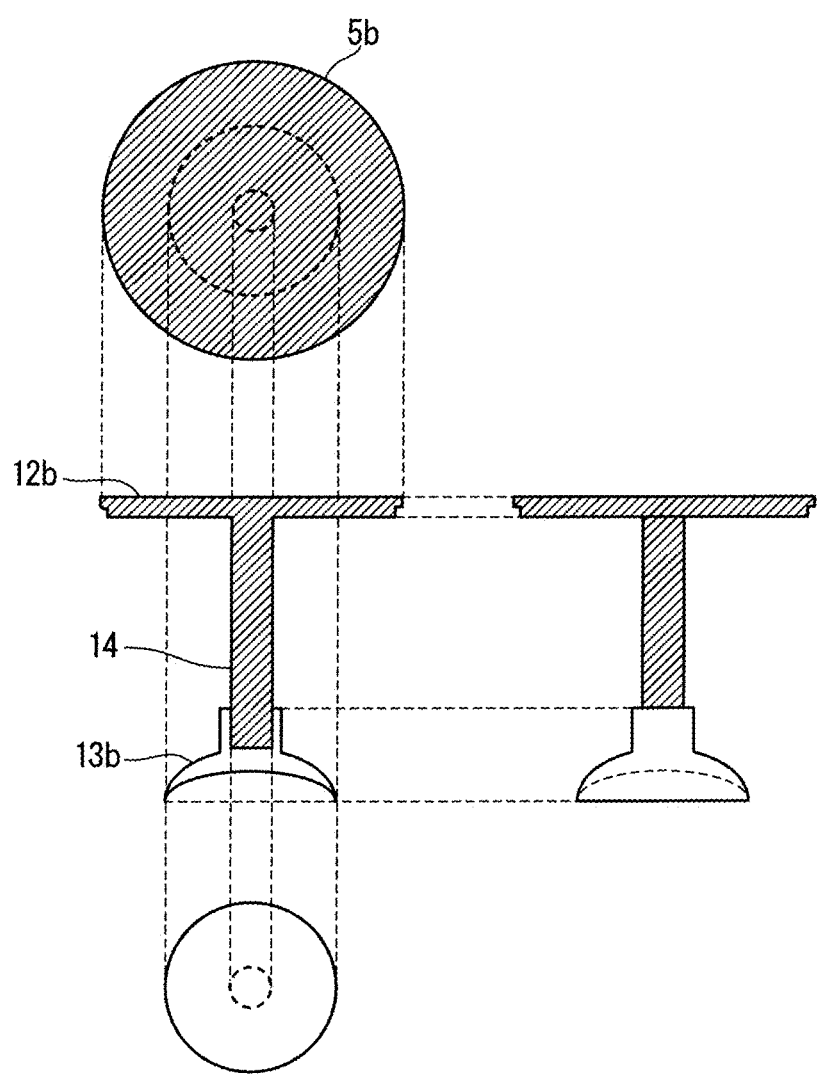
FIG. 34 is a schematic diagram of the fixing portion in a case where the tactile presentation knob according to the third embodiment of the present invention is operated by changing a position where the tactile presentation knob is placed.

FIG. 33 is a schematic diagram when a rotation portion 4b is placed on a contact surface of the tactile presentation touch panel 400 and rotated in a case where there are a plurality of positions where the tactile presentation knob 3 is placed and operation is performed while the position where the tactile presentation knob 3 is placed is changed. FIG. 34 is a schematic diagram of a fixing portion 5b serving as a rotation shaft when the rotation portion 4b is placed on a contact surface of the tactile presentation touch panel 400 and rotated in a case where there are a plurality of positions where the tactile presentation knob 3 is placed and operation is performed while the position where the tactile presentation knob 3 is placed is changed.

In a case where the tactile presentation knob 3 is placed at an optional position on the tactile presentation panel 100 and operated, it is necessary to have a structure in which the fixing portion 5*b* can be fixed onto or attached to or detached from the tactile presentation touch panel 400. For example, a structure in which the fixing table and the shaft portion are separated from each other may be used, and a sucker may be used as the fixing table like a fixing table 13*b*. The fixing table 13*b* that is a sucker is brought into close contact with an operation surface of the tactile presentation touch panel 400 by pushing a rotation portion upper surface 12*b*. In the case of the present structure, even if the tactile presentation panel 100 is fixed at an angle other than a plane, the rotation portion 4*b* does not come off, so that the angle of the operation surface can be optionally set.

In the case of the third embodiment, three or more of the position detection units 7 are arranged so as to be positioned at vertices of a regular polygon. Since the touch position does not become a regular polygon even when the indicator 2 performs multi-point touch, it is possible to distinguish between a case where the indicator 2 comes into contact and a case where the tactile presentation knob 3 comes into contact. When the tactile presentation knob 3 is not placed on the tactile presentation touch panel 400 or when the indicator 2 is not in contact with the tactile presentation knob 3, an operation timing (FIG. 22) when the indicator 2 is not in contact with the tactile presentation knob 3 is repeated. When it is detected that the position of the conductive elastic portion 6 moves and the tactile presentation knob 3 is operated, an area where the tactile presentation knob 3 is placed is operated by switching to an operation timing when the indicator 2 is in contact with the tactile presentation knob 3 as described above (FIG. 24) and operated.

When the indicator 2 comes into contact with the tactile presentation touch panel 400, switching is made to the operation timing when the indicator 2 comes into contact with the tactile presentation knob 3 as described above (FIG. 24) and operation is performed.

<Effect>

A dial knob operation position can be optionally set at a position where it is easy to operate for each operation situation and for each user, so that operability is improved. Since only the user who stores the tactile presentation knob 3 can operate dial knob operation, security is improved. By changing the arrangement of the conductive elastic portion 6 and pre-registering the layout and operation content of the conductive elastic portion 6, it is also possible to limit the operation content that can be operated for each of the tactile presentation knob 3.

Fourth Embodiment

Figure 35:
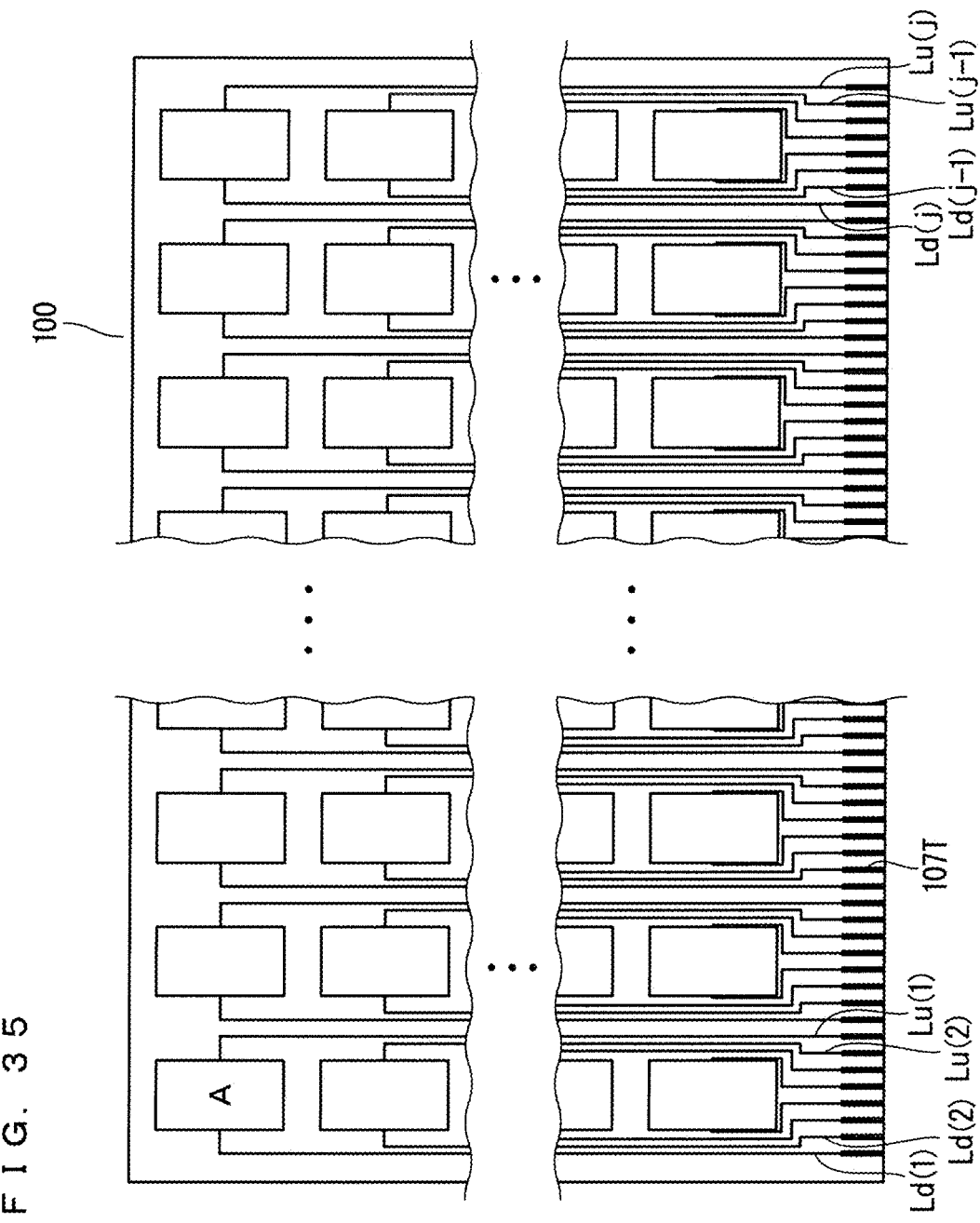
FIG. 35 is a plan view schematically illustrating a configuration of the tactile presentation panel having a segment structure according to a fourth embodiment of the present invention.
Figure 36:
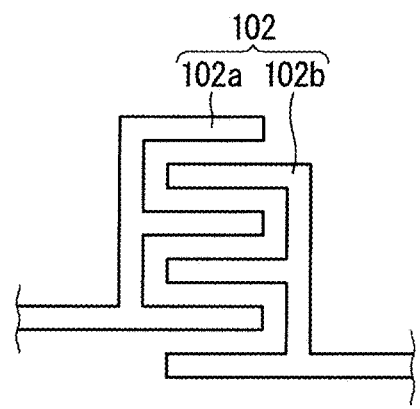
FIG. 36 is a plan view schematically illustrating an example of a tactile electrode shape of the tactile presentation panel having a segment structure according to the fourth embodiment of the present invention.
Figure 37:
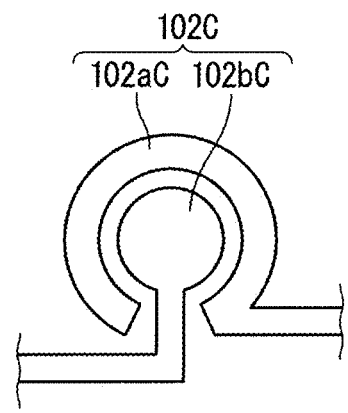
FIG. 37 is a plan view schematically illustrating an example of the tactile electrode shape of the tactile presentation panel having a segment structure according to the fourth embodiment of the present invention.

FIG. 35 is a plan view schematically illustrating a configuration of a tactile presentation panel 100*a* having a segment structure. FIGS. 36 and 37 illustrate examples of pattern shapes of the tactile electrodes 102 arranged in an area A in FIG. 35. The tactile presentation panel 100*a* having a segment structure in which units each including a set of the first electrode 102*a* and the second electrode 102*b* are arranged in a matrix and individually driven is used. The tactile presentation panel 100*a* and the touch panel 200 can also be used by switching switches in a drive circuit.

<Effect>

The weight of the tactile presentation touch display can be reduced by using both the tactile presentation panel 100*a* and the touch panel 200. Since signal voltage can be input only to an electrode immediately below the tactile presentation knob 3, there is an effect of suppressing power consumption.

Fifth Embodiment

A touch panel having the segment structure as illustrated in FIG. 35 may be arranged on the side opposite to an operation surface of the tactile presentation panel 100 illustrated in FIG. 12. Also in this case, the detection electrode and the excitation electrode arranged in the area A in FIG. 35 can have shapes as illustrated in FIGS. 36 and 37. Note that shapes of the detection electrode and the excitation electrode are not limited to the shapes illustrated in FIGS. 36 and 37, and the detection electrode and the excitation electrode only need to have a structure in which mutual capacitance in the same area is larger than mutual capacitance between electrodes in different areas in a structure in which the detection electrode and the excitation electrode are adjacent to each other. Specifically, the detection electrode and the excitation electrode in the same area may be arranged such that a distance between the detection electrode and the excitation electrode in the same area is shorter than a distance between the detection electrodes or the excitation electrodes in different areas. In this manner, the influence of capacitance formed between the detection electrode of the touch panel and the tactile electrode 102 on touch detection accuracy can be suppressed, so that wiring resistance of the tactile electrode 102 can be further reduced, and tactile strength can be further improved.

Note that a configuration other than the above is substantially the same as any of the configurations of the above-described first to third embodiments, and thus the description of the configuration will be omitted.

Note that, in the present invention, within the scope of the invention, preferred embodiments can be freely combined with each other, and each preferred embodiment can be appropriately modified or omitted.

Although the present invention has been described in detail, the above explanation is exemplary in all the aspects, and the present invention is not limited to the explanation. It is understood that countless variations that are not exemplified are conceivable without departing from the scope of the present invention.

EXPLANATION OF REFERENCE SIGNS

1: tactile presentation touch display
3: tactile presentation knob
4: rotation portion
5: fixing portion
6: conductive elastic portion
6*a*: outer diameter
7: position detection unit
8: gap
9: fixing hole
10: rotation portion side surface
11: indication position line
12: rotation portion upper surface
13: fixing table
14: shaft portion
15: bottom surface portion
16: boundary portion conductive portion
17: adhesive portion 20a, 20b: adhesive
40: switch
100: tactile presentation panel
101: transparent insulating substrate
102: tactile electrode
102a: first electrode
102b: second electrode
106: dielectric layer
107: tactile presentation panel terminal portion
108: FPC
110: voltage supply circuit
113: tactile presentation voltage generation circuit
113a: first voltage generation circuit
113b: second voltage generation circuit
114: tactile presentation control circuit
115: charge discharge portion
150: tactile presentation screen
200: touch panel
201: substrate
202: excitation electrode
203: detection electrode
204: interlayer insulating film
205: insulating film
206: row direction wiring layer
207: column direction wiring layer
208: touch screen terminal portion
209: shield wiring layer
210: touch detection circuit
212: charge detection circuit
213: touch detection control circuit
214: touch coordinate calculation circuit
215: excitation pulse generation circuit
300: display panel
400: tactile presentation touch panel

The invention claimed is:

1. A tactile presentation panel in which a tactile presentation knob having a plurality of conductive elastic portions is placed on an operation surface, the tactile presentation panel presenting a tactile sense to a user via the tactile presentation knob, the tactile presentation panel comprising:
a tactile electrode including a plurality of first electrodes and a plurality of second electrodes provided on the operation surface of the tactile presentation panel;
a dielectric layer covering the tactile electrode and having one surface as the operation surface;
a voltage generation circuit that generates a voltage signal having a first frequency to be applied to at least one of the first electrodes located in at least a partial region on the operation surface of the tactile presentation panel, and generates a voltage signal having a second frequency different from the first frequency to be applied to at least one of the second electrodes located in at least a partial region on the operation surface of the tactile presentation panel;
a charge discharge portion that is connected to the tactile electrode; and
a contact detection circuit that detects contact of the user with the tactile presentation knob,
wherein
at least one of the first electrodes and the voltage generation circuit are directly connected while the user is in contact with the tactile presentation knob, at least another one of the first electrodes and the voltage generation circuit are not operatively connected, the at least another one of the first electrodes being operatively connected to the charge discharge portion, and the second electrode and the charge discharge portion are directly connected while the user is in contact with the tactile presentation knob,
the at least one of the first electrodes is operatively connected to the voltage generation circuit and at least part of the conductive elastic portions face each other with the dielectric layer therebetween,
the at least one of the second electrodes is operatively connected to the charge discharge portion and at least part of the conductive elastic portions which does not face the first electrode face each other with the dielectric layer therebetween, and
the charge discharge portion is configured to discharge charges accumulated in the conductive elastic portions, and
a number of the at least one of the second electrodes that are operatively connected to the charge discharge portion is smaller than a number of the at least another one of the second electrodes that are not operatively connected to the charge discharge portion, or a duration of the at least one of the second electrodes being operatively connected to the charge discharge portion is shorter than a duration of the voltage signal having the second frequency being applied to the at least another one of the second electrodes.

2. A tactile presentation panel in which a tactile presentation knob having a plurality of conductive elastic portions is placed on an operation surface, the tactile presentation panel presenting a tactile sense to a user via the tactile presentation knob, the tactile presentation panel comprising:
a tactile electrode including a plurality of first electrodes and a plurality of second electrodes provided on the operation surface of the tactile presentation panel;
a dielectric layer covering the tactile electrode and having one surface as the operation surface;
a voltage generation circuit that generates a voltage signal having a first frequency to be applied to at least one of the first electrodes located in at least a partial region on the operation surface of the tactile presentation panel, and generates a voltage signal having a second frequency different from the first frequency to be applied to at least one of the second electrodes located in at least a partial region on the operation surface of the tactile presentation panel;
a charge discharge portion that is connected to the tactile electrode; and
a contact detection circuit that detects contact of the user with the tactile presentation knob,
wherein
the first electrode and the voltage generation circuit are connected, and the second electrode and the charge discharge portion are connected while the user is in contact with the tactile presentation knob,
at least one of the first electrodes is operatively connected to the voltage generation circuit while the user is in contact with the tactile presentation knob, at least another one of the first electrodes and the voltage generation circuit are not operatively connected while the user is in contact with the tactile presentation knob, the at least another one of the first electrodes being operatively connected to the charge discharge portion, and at least part of the conductive elastic portions face each other with the dielectric layer therebetween,
at least one of the second electrodes is operatively connected to the charge discharge portion and at least part of the conductive elastic portions which does not face the first electrode face each other with the dielectric layer therebetween, and at least another one of the second electrodes and the charge discharge portion are not operatively connected while the user is in contact with the tactile presentation knob, the at least another one of the second electrodes being operatively connected to the voltage generation circuit, each of the conductive elastic portions is divided into a plurality of portions on a same plane, and overlaps at least one of the first electrodes and the second electrode adjacent to each other in plan view, and a number of the at least one of the second electrodes that are operatively connected to the charge discharge portion is smaller than a number of the at least another one of the second electrodes that are not operatively connected to the charge discharge portion, or a duration of the at least one of the second electrodes being operatively connected to the charge discharge portion is shorter than a duration of the signal having the second frequency being applied to the at least another one of the second electrodes.

3. A tactile presentation panel in which a tactile presentation knob having a plurality of conductive elastic portions is placed on an operation surface, the tactile presentation panel presenting a tactile sense to a user via the tactile presentation knob, the tactile presentation panel comprising:

a tactile electrode including a plurality of first electrodes and a plurality of second electrodes provided on the operation surface of the tactile presentation panel;

a dielectric layer covering the tactile electrode and having one surface as the operation surface;

a voltage generation circuit that generates a voltage signal having a first frequency to be applied to at least one of the first electrodes located in at least a partial region on the operation surface of the tactile presentation panel, and generates a voltage signal having a second frequency different from the first frequency to be applied to at least one of the second electrodes located in at least a partial region on the operation surface of the tactile presentation panel;

a charge discharge portion that is connected to the tactile electrode; and a contact detection circuit that detects contact of the user with the tactile presentation knob, wherein the tactile presentation knob includes a position detection portion used when the contact detection circuit of the tactile presentation panel detects a position of the tactile presentation knob on the operation surface of the tactile presentation panel, the tactile presentation knob includes a fixing portion that fixes the tactile presentation knob to the operation surface of the tactile presentation panel and serves as a central axis for rotating the tactile presentation knob, at least one of the first electrodes and the voltage generation circuit are operatively connected while the user is in contact with the tactile presentation knob, and at least another one of the first electrodes and the voltage generation circuit are not operatively connected while the user is in contact with the tactile presentation knob, the at least another one of the first electrodes being operatively connected to the charge discharge portion, and at least one of the second electrodes and the charge discharge portion are operatively connected while the user is in contact with the tactile presentation knob, and at least another one of the second electrodes and the charge discharge portion are not operatively connected while the user is in contact with the tactile presentation knob, the at least another one of the second electrodes being operatively connected to the voltage generation circuit, the at least one of the first electrodes that is operatively connected to the voltage generation circuit and at least part of the conductive elastic portions face each other with the dielectric layer therebetween, the at least one of the second electrodes that is operatively connected to the charge discharge portion and at least part of the conductive elastic portions which does not face the first electrode face each other with the dielectric layer therebetween, each of the conductive elastic portions and the position detection portion are electrically connected to a side surface of the tactile presentation knob, and are grounded via the user when the user is in contact with the tactile presentation knob, and a number of the at least one of the second electrodes that are operatively connected to the charge discharge portion is smaller than a number of the at least another one of the second electrodes that are not operatively connected to the charge discharge portion, or a duration of the at least one of the second electrodes being operatively connected to the charge discharge portion is shorter than a duration of the voltage signal having the second frequency being applied to the at least another one of the second electrodes.

4. The tactile presentation panel according to claim 3, wherein the charge discharge portion is a GND terminal.

5. The tactile presentation panel according to claim 3, further comprising a switching circuit that is provided between the voltage generation circuit and the charge discharge portion and switches connection between the tactile electrode and the voltage generation circuit or the charge discharge portion.

6. The tactile presentation panel according to claim 5, wherein the switching circuit connects at least one of the first electrodes and one of the second electrodes adjacent to each other among respective ones of the first electrodes and the second electrodes overlapping the tactile presentation knob in plan view and the voltage generation circuit, and connects at least one of the first electrode and the second electrode to the charge discharge portion.

7. The tactile presentation panel according to claim 3, wherein the contact detection circuit detects that the tactile presentation knob is placed on the operation surface of the tactile presentation panel.

8. The tactile presentation panel according to claim 3, wherein the contact detection circuit detects a position of the tactile presentation knob on the operation surface of the tactile presentation panel by using the position detection portion included in the tactile presentation knob.

9. The tactile presentation panel according to claim 8, wherein the contact detection circuit calculates a rotation angle of the tactile presentation knob by using the position detection portion.

10. The tactile presentation panel according to claim 3, wherein generation of the voltage signal having the first frequency or the voltage signal having the second frequency by the voltage generation circuit and the detection by the contact detection circuit are performed in a time division manner, and the contact detection circuit detects capacitance formed between the tactile presentation knob and a detection electrode provided on a side opposite to the tactile presentation knob of the tactile electrode.

11. The tactile presentation panel according to claim 3, wherein one of the first electrodes and one of the second electrodes are arranged as a pair in a matrix.

12. A tactile presentation touch panel comprising:
the tactile presentation panel according to claim 3; and
a touch panel arranged on a side opposite to the operation surface of the tactile presentation panel,
wherein the contact detection circuit is included in the touch panel instead of the tactile presentation panel.

13. The tactile presentation touch panel according to claim 12, wherein a detection electrode and an excitation electrode of the touch panel are arranged as a pair in a matrix.

14. A tactile presentation touch display comprising:
the tactile presentation touch panel according to claim 12; and
a display panel attached to the tactile presentation touch panel.

15. A tactile presentation knob configured to be placed on an operation surface of a tactile presentation panel that presents a tactile sense to a user via the tactile presentation knob,
the tactile presentation panel including a tactile electrode including
a plurality of first electrodes and a plurality of second electrodes provided on the operation surface of the tactile presentation panel,
a dielectric layer covering the tactile electrode and having one surface as the operation surface,
a voltage generation circuit that generates a voltage signal having a first frequency to be applied to at least one of the first electrodes located in at least a partial region on the operation surface of the tactile presentation panel, and generates a voltage signal having a second frequency different from the first frequency to be applied to at least one of the second electrodes located in at least a partial region on the operation surface of the tactile presentation panel,
a charge discharge portion that is connected to the tactile electrode, and
a contact detection circuit that detects contact of the user with the tactile presentation knob,
wherein
at least one of the first electrodes and the voltage generation circuit are operatively connected while the user is in contact with the tactile presentation knob, and at least another one of the first electrodes and the voltage generation circuit are not operatively connected, the at least another one of the first electrodes being operatively connected to the charge discharge portion,
and at least one of the second electrodes and the charge discharge portion are operatively connected while the user is in contact with the tactile presentation knob, and at least another one of the second electrodes and the charge discharge portion are not operatively connected, the at least another one of the second electrodes being operatively connected to the voltage generation circuit,
the at least one of the first electrodes that is operatively connected to the voltage generation circuit and at least part of conductive elastic portions face each other with the dielectric layer therebetween,
the at least one of the second electrodes that is operatively connected to the charge discharge portion and at least part of the conductive elastic portions which does not face the first electrode face each other with the dielectric layer therebetween, and
a number of the at least one of the second electrodes that are operatively connected to the charge discharge portion is smaller than a number of the at least another one of the second electrodes that are not operatively connected to the charge discharge portion, or a duration of the at least one of the second electrodes being operatively connected to the charge discharge portion is shorter than a duration of the voltage signal having the second frequency being applied to the at least another one of the second electrodes,
the tactile presentation knob comprising:
a position detection portion used when the contact detection circuit of the tactile presentation panel detects a position of the tactile presentation knob on the operation surface of the tactile presentation panel;
a fixing portion that fixes the tactile presentation knob to the operation surface of the tactile presentation panel and serves as a central axis for rotating the tactile presentation knob; a plurality of conductive elastic portions configured to be placed on the operation surface of the tactile presentation panel, and the position detection portion configured to be placed on the operation surface of the tactile presentation panel,
wherein each of the conductive elastic portions is provided at a position facing the operation surface,
each of the conductive elastic portions and the position detection portion are electrically connected to a side surface of the tactile presentation knob, and are grounded via the user when the user is in contact with the tactile presentation knob, and
the contact detection circuit detects a position of the tactile presentation knob on the operation surface of the tactile presentation panel using the position detection portion.

16. The tactile presentation knob according to claim 15, wherein each of the conductive elastic portions is divided into a plurality of portions on a same plane, and at least one of the conductive elastic portions overlaps at least one of the first electrodes and one of the second electrodes adjacent to each other in plan view.

17. The tactile presentation knob according to claim 15, wherein
the tactile presentation knob has a circular shape in plan view, and
an outer diameter of each of the conductive elastic portions of the tactile presentation knob is larger than a pitch of each of the first electrodes or each of the second electrodes.

18. The tactile presentation knob according to claim 15, wherein the conductive elastic portions have a larger area than the position detection portion in plan view, and are alternately provided with a space from the position detection portion.

* * * * *